US008636229B1

(12) United States Patent
Clark et al.

(10) Patent No.: US 8,636,229 B1
(45) Date of Patent: Jan. 28, 2014

(54) LOW PRECIPITATION RATE ROTOR-TYPE SPRINKLER WITH INTERMITTENT STREAM DIFFUSER

(75) Inventors: Michael L. Clark, San Marcos, CA (US); Donald M. Sheetz, III, Oceanside, CA (US)

(73) Assignee: Hunter Industries, Inc., San Marcos, CA (US)

( * ) Notice: Subject to any disclaimer, the term of this patent is extended or adjusted under 35 U.S.C. 154(b) by 871 days.

(21) Appl. No.: 12/612,599

(22) Filed: Nov. 4, 2009

(51) Int. Cl.

| | |
|---|---|
| ***A01G 25/06*** | (2006.01) |
| ***B05B 15/06*** | (2006.01) |
| ***B05B 3/08*** | (2006.01) |
| ***B05B 3/16*** | (2006.01) |
| ***B05B 1/26*** | (2006.01) |

(52) U.S. Cl.
USPC ........... 239/232; 239/201; 239/206; 239/240; 239/242; 239/507; 239/513

(58) Field of Classification Search
USPC ......... 239/201, 205, 206, 210, 232, 237, 240, 239/242, 263, 507, 511, 513, 521
See application file for complete search history.

(56) References Cited

U.S. PATENT DOCUMENTS

| | | | | |
|---|---|---|---|---|
| 4,234,126 | A | 11/1980 | Morgan | |
| 4,580,724 | A | 4/1986 | Brown et al. | |
| 4,624,412 | A * | 11/1986 | Hunter | 239/232 |
| 4,836,449 | A * | 6/1989 | Hunter | 239/232 |
| 4,836,450 | A | 6/1989 | Hunter | 239/232 |
| 5,423,486 | A | 6/1995 | Hunter | 239/205 |
| 5,758,827 | A * | 6/1998 | Van Le et al. | 239/242 |
| 5,765,757 | A * | 6/1998 | Bendall | 239/205 |
| 7,287,711 | B2 * | 10/2007 | Crooks | 239/240 |
| 7,530,504 | B1 * | 5/2009 | Danner et al. | 239/240 |
| 7,828,230 | B1 * | 11/2010 | Anuskiewicz et al. | 239/263 |

* cited by examiner

*Primary Examiner* — Ryan Reis
(74) *Attorney, Agent, or Firm* — Knobbe, Martens, Olson & Bear LLP

(57) ABSTRACT

An irrigation sprinkler includes a riser and a nozzle mounted at the top of the riser that can rotate and emit a stream of water. The sprinkler further includes a diffuser mechanism that can intermittently interrupt the stream of water as the nozzle rotates. A gear train reduction is mounted in the riser and a turbine is coupled to an input shaft of the gear train reduction and is rotatable by water flowing through the riser. A drive assembly couples the nozzle and the gear train reduction and is configured to allow a user to select between a full-circle mode of operation and an oscillating mode of operation.

21 Claims, 27 Drawing Sheets

LOW PRECIPITATION RATE ROTOR-TYPE SPRINKLER WITH INTERMITTENT STREAM DIFFUSER

FIELD OF THE INVENTION

The present invention relates to sprinklers used in residential and commercial irrigation for watering turf and landscaping.

BACKGROUND OF THE INVENTION

Many parts of the world lack sufficient rainfall at different times of the year to maintain the health of turf and landscaping. Irrigation systems are therefore used to deliver water to such vegetation from municipal water supplies and wells according to a watering schedule. A typical irrigation system comprises a programmable controller that turns valves ON and OFF to deliver water through a plurality of sprinklers connected to the valves via subterranean pipes. These sprinklers are usually rotor-type, impact, spray, or rotary-stream sprinklers. A rotor-type sprinkler includes a—riser that houses a turbine and gear reduction mechanism that rotates a nozzle that typically ejects a relatively large stream of water. The riser may be installed above the ground or be installed within an outer housing that allows it to pop-up when water pressure is applied.

Unfortunately rotor-type sprinklers often apply water at an application rate that is greater the ability of the soil to absorb it. When water is applied at a higher application rate that the soil can absorb, the excess water runs off of the irrigated area and is wasted. In applications where sprinklers are used to irrigate landscape that cannot absorb water very fast, or on hills and slopes, it is desirable to use low precipitation rate sprinklers. Low precipitation rate rotary-stream sprinklers have been installed in residential and commercial applications. However, rotary-stream sprinklers have a limited range or radius and are not suitable for use when large areas of landscape must be covered.

U.S. Pat. No. 4,836,450 of Hunter discloses a low precipitation rate rotor-type sprinkler utilizing a diffuser device that selectively interrupts the stream of water emitted from the nozzle and operates only in a part circle (oscillating) mode. The stream interrupter only interrupts the stream of water during counter-clockwise rotation of the nozzle and does not interrupt the stream during clockwise rotation of the nozzle. U.S. Pat. No. 4,836,449 of Hunter discloses a rotor-type sprinkler utilizing a diffuser device that selectively interrupts the stream of water emitted from the nozzle and operates only in a full circle (360 degree) mode. U.S. Pat. No. 5,423,486 of Hunter discloses a rotor-type sprinkler that operates only in a full circle (360 degree) mode with a stainless steel sleeve added to protect the intricate workings of the diffuser mechanism of the sprinkler from contamination of the surrounding soil when it is extending or retracting during normal operation.

SUMMARY OF THE INVENTION

In accordance with the present invention an irrigation sprinkler includes a riser and a nozzle mounted at the top of the riser for rotation and configured to emit a stream of water. The sprinkler further includes a diffuser mechanism that can intermittently interrupt the stream of water as the nozzle rotates. A gear train reduction is mounted in the riser and a turbine is coupled to an input shaft of the gear train reduction and is rotatable by water flowing through the riser. A drive assembly couples the nozzle and the gear train reduction and is configured to allow a user to select between a full-circle mode of operation and an oscillating mode of operation.

DETAILED DESCRIPTION

Figure 1:
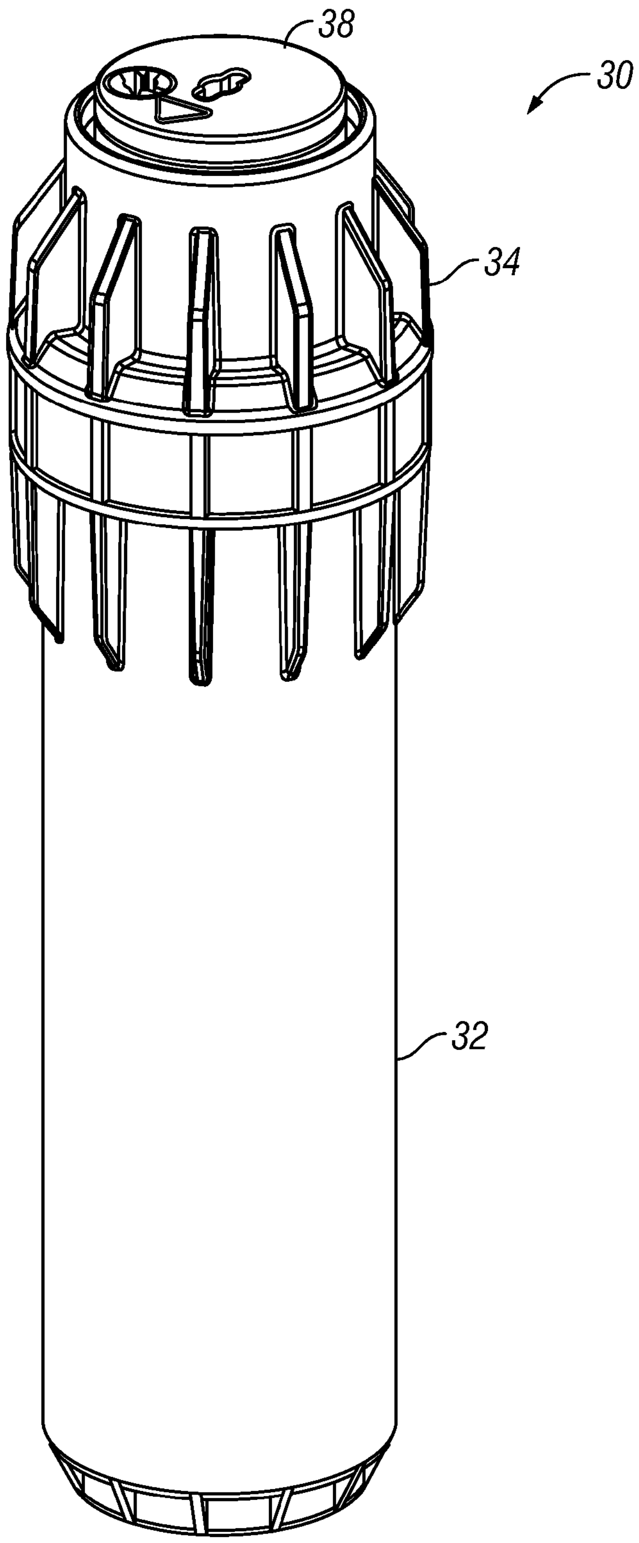
FIG. 1 is an isometric view of an assembled sprinkler representing an embodiment of the present invention.
Figure 2:
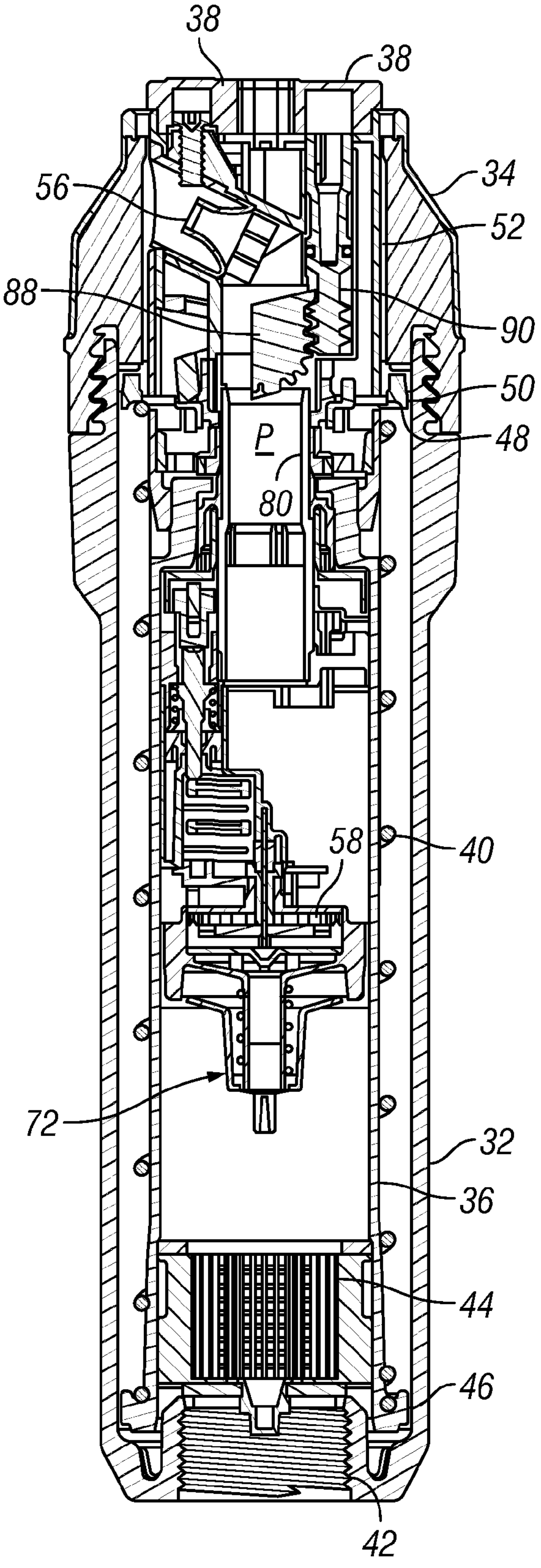
FIG. 2 is a vertical cross-sectional view of the sprinkler of FIG. 1.

FIG. 1 illustrates a low precipitation rate pop-up rotor type irrigation sprinkler 30 that represents an embodiment of the present invention. The sprinkler 30 designed to conserve water in the irrigation of turf and landscaping while maintaining the health of the vegetation. It is fabricated out of injection molded plastic parts, metal shafts, steel springs and seals made of a suitable elastomeric material. The sprinkler 30 includes a cylindrical outer case 32 and an end cap 34 which is threaded onto the cylindrical outer case to contain a tubular riser 36 (FIG. 2). An elastomeric cover 38 is mounted to the top of the tubular riser 36 contained within the outer case 32.

Referring still to FIG. 2, the tubular riser 36 is telescopically extensible from the outer case 32 by water pressure and normally held in a lowered retracted position by a surrounding coil spring 40. The riser 36 is mounted co-axial with the case 32 and the riser 36 reciprocates vertically along its central longitudinal axis. The case 32 has a female threaded inlet 42 at is lower end for screwing over a male threaded fitting connected to a subterranean pipe (not illustrated) which is in turn connected to a source of pressurized water such as a solenoid-actuated valve (not illustrated). See U.S. Pat. No. 5,979,863 granted Nov. 9, 1999 to Bradley M. Lousberg and assigned to Hunter Industries, Inc., the assignee of the subject application. A screen 44 filters out debris from the water source that could otherwise render the sprinkler 30 inoperative.

The end cap 34 has a ring-shaped female threaded configuration so that it can be screwed over a male threaded upper end of the case 32. The lower end of the coil spring 40 seats in an upwardly opening annular groove formed in a lower shoulder 46 of the riser 36. The upper end of the coil spring 40 seats in a downwardly opening annular groove in a rigid retainer ring 48 held in place by the end cap 34. The riser 36 can telescope upwardly and downwardly through the end cap 34 to an extended position (not illustrated) when water pressure is applied at the inlet 42. This compresses the coil spring 40. When the water pressure is turned OFF the force of the compressed coil spring 40 pushes the riser 36 back to its retracted position illustrated in FIG. 2. An elastomeric wiper seal 50 is positioned between the riser 36, the retainer ring 48 and the case 32.

Figure 3:
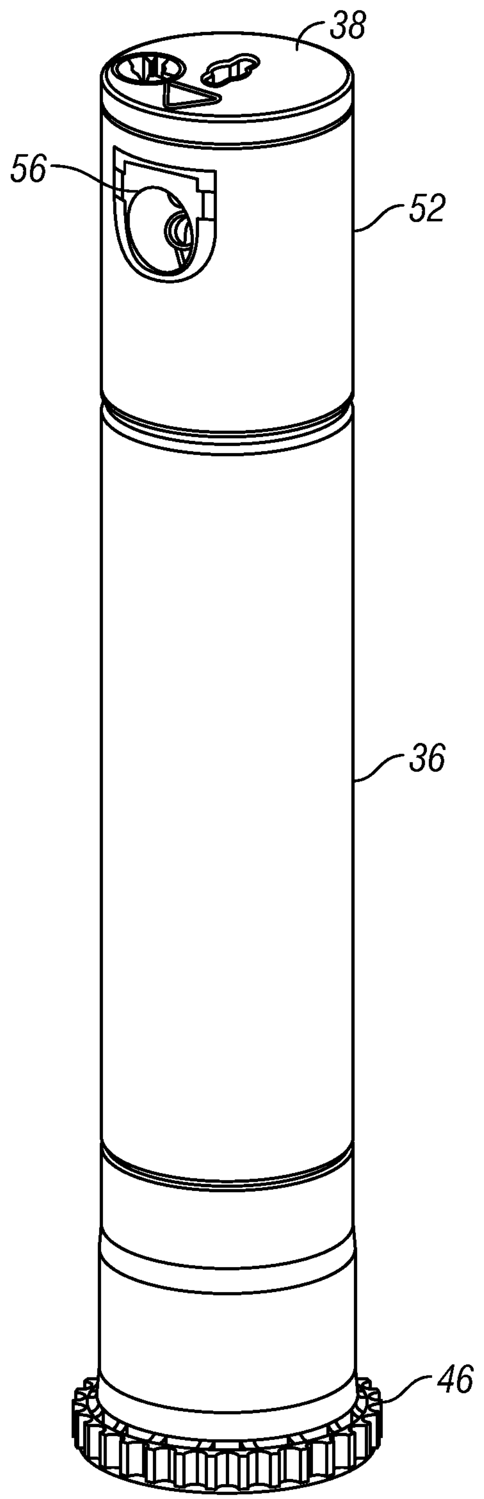
FIG. 3 is a view of the telescoping riser of the sprinkler of FIG. 1.
Figure 4:
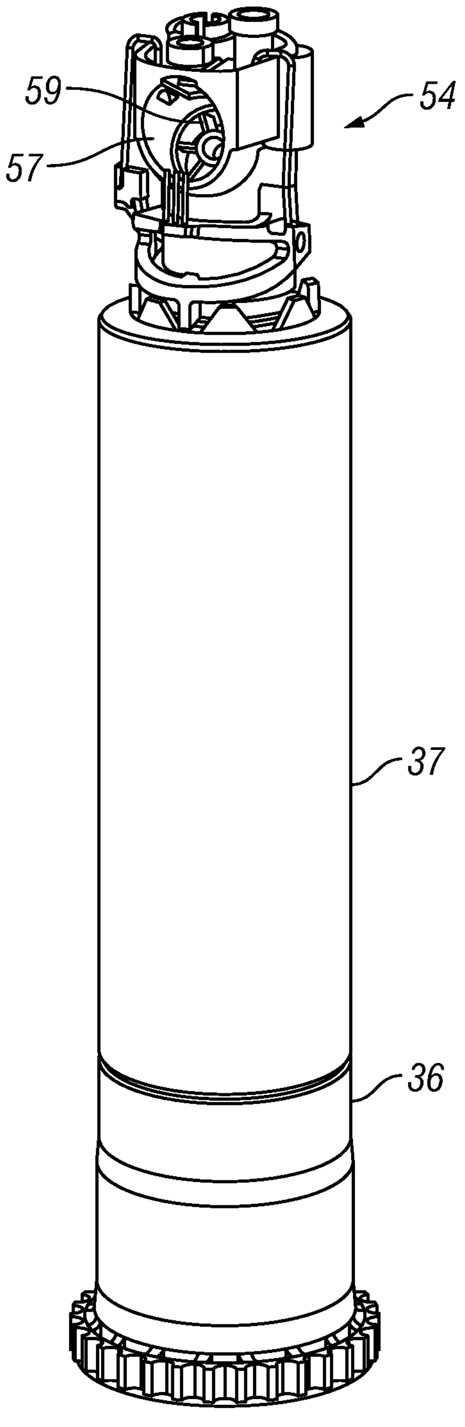
FIG. 4 is a view of the riser with a cover removed from the turret portion of the sprinkler

A cylindrical turret cover 52, (FIG. 3) is attached to a turret assembly 54 (FIG. 4) rotatably mounted at an upper end of the riser 36. A nozzle 56 is removably mounted through an aperture in the cylindrical cover 52 into the turret assembly 54. The nozzle 56 has a main orifice sized to deliver the desired flow rate in terms of gallons per minute (GPM). The nozzle 56 is preferably removable and may be of the type disclosed in U.S. Pat. No. 5,456,411; 5,699,962 or 6,871,795, all assigned to Hunter Industries, Inc., and the entire disclosures of which are hereby incorporated by reference.

Figure 5:
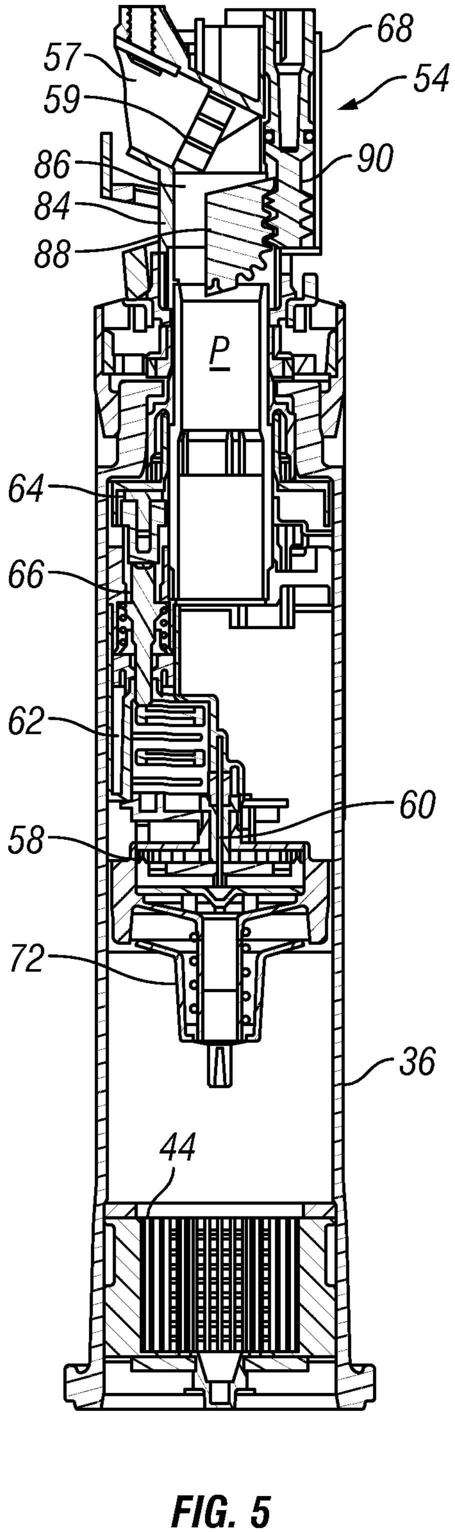
FIG. 5 is a vertical cross-sectional view of the riser illustrating its internal components.
Figure 6:
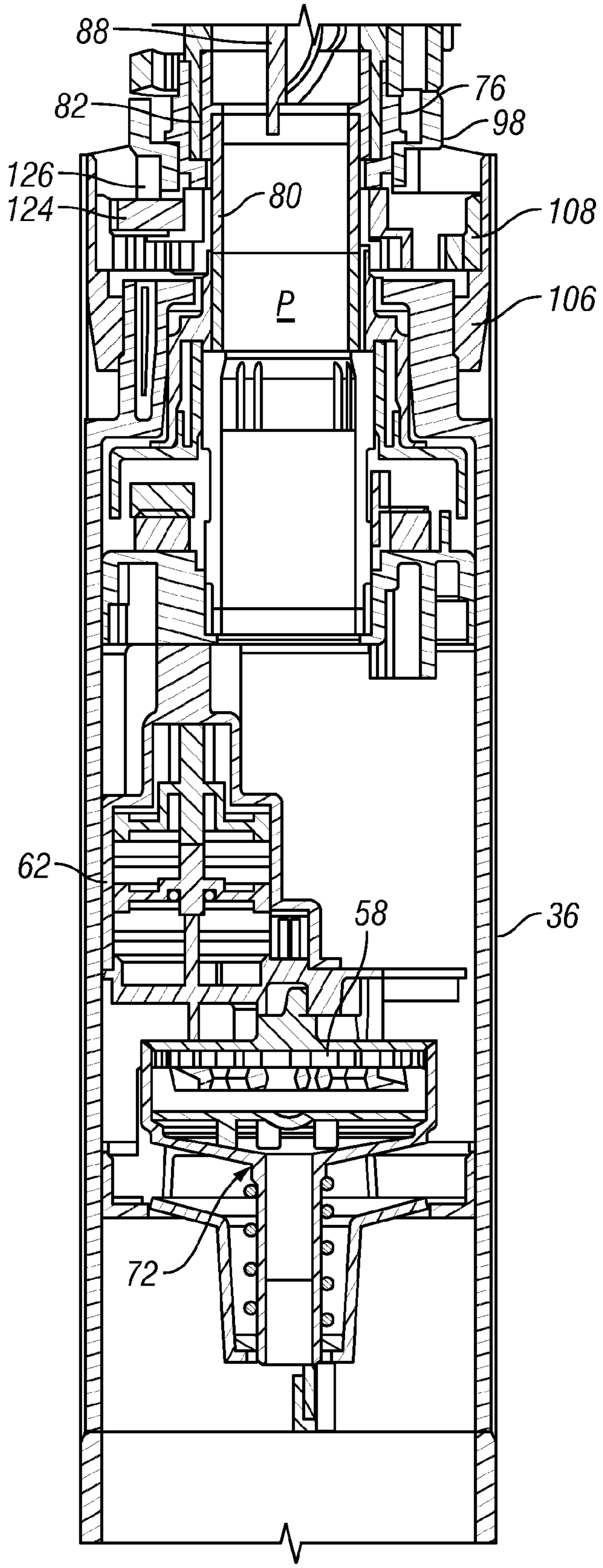
FIG. 6 is an enlarged portion of FIG. 5.

A turbine 58 (FIG. 5) is mounted in the riser 36 for rotation about a vertical axis by water entering the lower end of the riser 36. The turbine 58 is mounted to the input shaft 60 of a staggered gear train reduction 62 mounted in the riser 36. An arc-adjustable reversing mechanism 64 is mounted in the riser 36 and couples to a slip clutch 66 which transmits the drive force from the output of the gear train reduction 62 to drive a nozzle turret 68. A suitable slip clutch is disclosed in U.S. Pat. No. 7,530,504 granted May 12, 2009 to Fred M. Danner et al. and entitled “Clutch for Rotor-Type Sprinkler”, also assigned to Hunter Industries, Inc., the entire disclosure of which is also hereby incorporated by reference. The clutch 66 is preferably of the type disclosed in pending U.S. patent application Ser. No. 11/846,480 of Ronald Anuskiewicz, also assigned to Hunter Industries, Inc. The entire disclosure of said U.S. patent application Ser. No. 11/846,480 is also hereby incorporated by reference.

Figure 7:
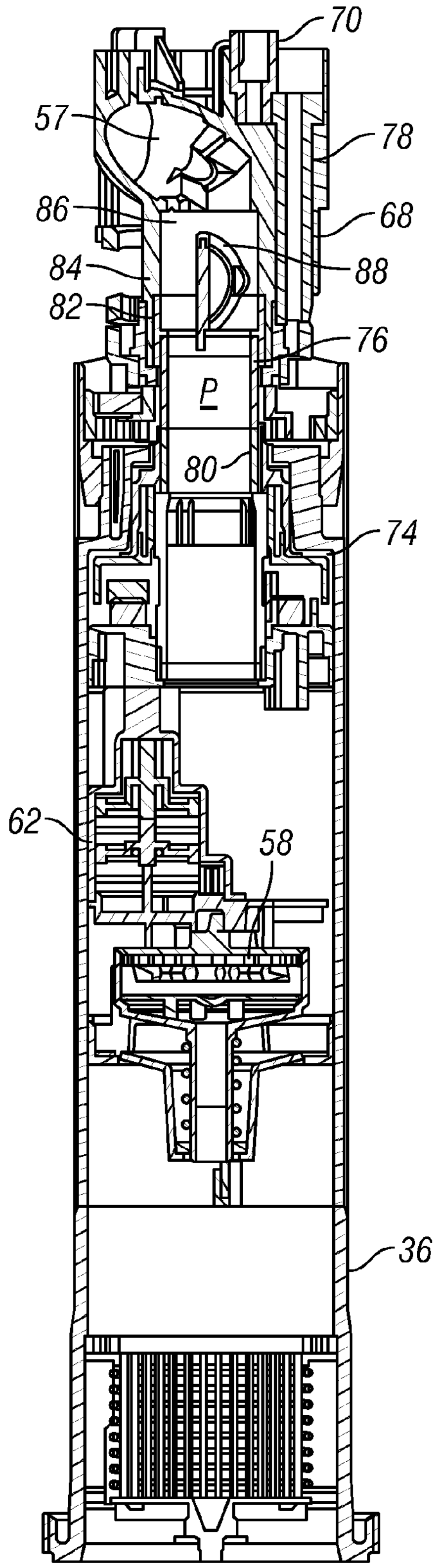
FIG. 7 is a vertical cross-sectional view of the internal components of the riser illustrating its arc adjusting components.

The illustrated reversing mechanism 64 is one form of a gear driven coupling mechanism that optionally allows the arc adjusting gear 70 (FIG. 7) to adjust the mode of operation of the sprinkler 30 from the top-side thereof so that it will rotate the nozzle turret 68 and the nozzle 56 contained therein back and forth between selected arc limits to provide an oscillating sprinkler or rotate the nozzle turret 68 in a continuous uni-directional manner. Other forms of gear driven couplings can be used to rotate the nozzle turret 68 and nozzle 56 solely in an oscillating manner. Other forms of the gear driven coupling can be used to rotate the nozzle turret 68 and nozzle 56 only in a continuous uni-directional manner. A spring-biased stator 72 (FIG. 5) is mounted in the lower end of the riser 36 beneath the turbine 58 for controlling the RPM of the turbine 58.

Figure 8:
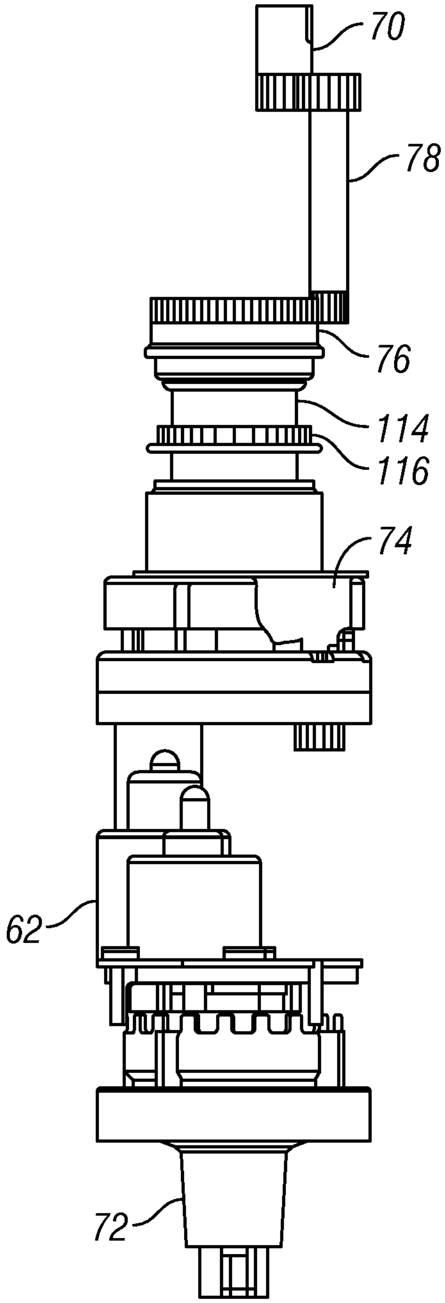
FIG. 8 is a side elevation view of the arc adjusting components.

The reversing mechanism 64 is preferably of the type disclosed in U.S. Pat. No. 7,287,711 granted Oct. 30, 2007 to John D. Crooks and entitled “Adjustable Arc Rotor-Type Sprinkler with Selectable Uni-directional Full Circle Nozzle Rotation, also assigned to Hunter Industries, Inc., the entire disclosure of which is hereby incorporated by reference See also the disclosures of U.S. Pat. Nos. 4,836,350, 4,836,449; and 5,243,486, all granted to Edwin J. Hunter, the entire disclosures of which are also hereby incorporated by reference. As explained in U.S. Pat. No. 7,287,711, an arc adjusting sleeve 74 (FIGS. 7 and 8) carrying saw-tooth shaped trip tabs (not illustrated) trips a shift dog (not illustrated) to reverse the direction of rotation of the nozzle turret 68 and the nozzle 56 contained therein. When the sprinkler 30 is adjusted to increase the arc of rotation to 360 degrees, the shift dog is cammed away to prevent the nozzle turret 68 from shifting rotational direction, and allowing the nozzle turret 68 to rotate continuously in one direction, i.e. uni-directional rotation. At an arc setting less than 360 degrees, the shift dog shifts the reversing mechanism to create an oscillating action of the nozzle turret 68. The arc adjusting sleeve 74 is rotationally coupled for adjustment to arc adjusting gear extension 76 which is rotated by an arc adjusting idler gear 78. The arc adjusting idler gear 78 is rotated when an operator inserts an appropriate tool in the top of the arc adjusting gear 70 to make a radial arc adjustment or setting to the motion of the of the nozzle turret 68.

A vertically extending cylindrical bull gear stem 80 (Fig. F) is rotationally coupled in a concentric fashion with the reversing mechanism 64 and provides a hollow tubular drive shaft that couples the nozzle turret 68 via a bull gear coupling 82. The upper end of the bull gear stem 80 is securely bonded to the bull gear coupling 82 which in turn is securely bonded in a cylindrical sleeve 84 of the nozzle turret 68. The nozzle turret 68 and the nozzle 56 inserted therein are thus supported for rotation relative to the riser 36 and the case 32 by the bull gear stem 80. The upper end of the bull gear stem 80 terminates closely adjacent to the lower segment of a dog-legged tubular structure 86 formed in the nozzle turret 68. The lower segment of the tubular structure 86 is cylindrical and centered axially in the nozzle turret 68. The nozzle 56 is inserted into the upper inclined, radially extending segment 57 of the tubular structure 86 downstream from stream straighteners 59. The interior of the bull gear stem 80 provides a relatively large central flow passage P that conveys water to the nozzle 56. A flow control valve member 88 (FIG. 5) is pivotally mounted in the lower segment of the tubular structure 86 within the passage P to adjust the flow of water emitted through the nozzle 56. A flow control adjusting screw 90 can be turned by a service person to cause the flow control valve member 88 to pivot and either reduce or increase the amount of water that can flow through tubular structure 86. See U.S. Pat. No. 6,241,158 granted Jun. 5, 2001 to Mike Clark entitled "Irrigation Sprinkler with Pivoting Throttle Valve", also assigned to Hunter Industries, Inc., the entire disclosure of which is also hereby incorporated by reference.

Figure 9A:
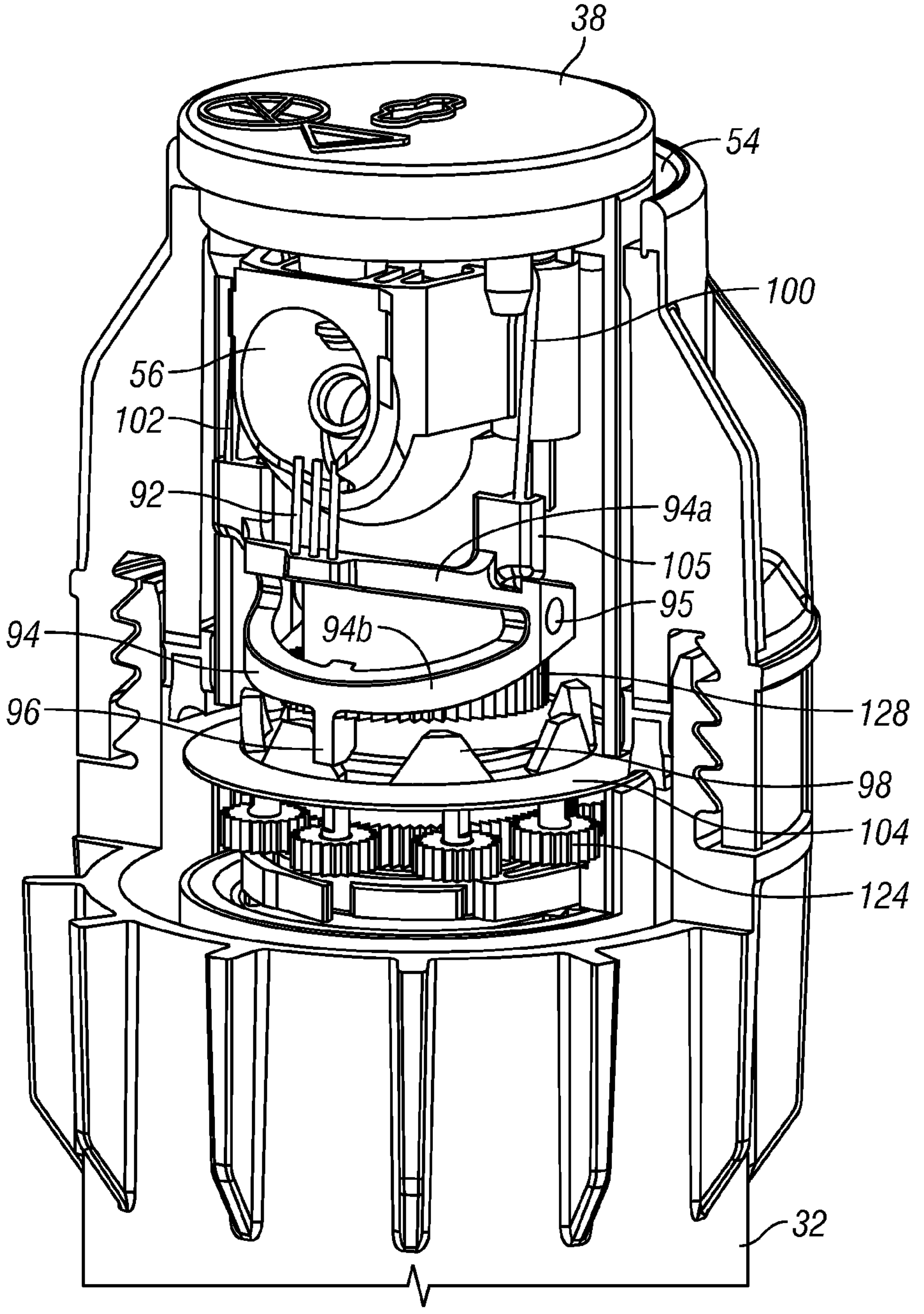
FIG. 9A is an enlarged isometric view of the nozzle and the diffuser mechanism of the sprinkler of FIG. 1 that interrupts a stream of water (not illustrated) that is ejected from the nozzle.
Figure 9B:
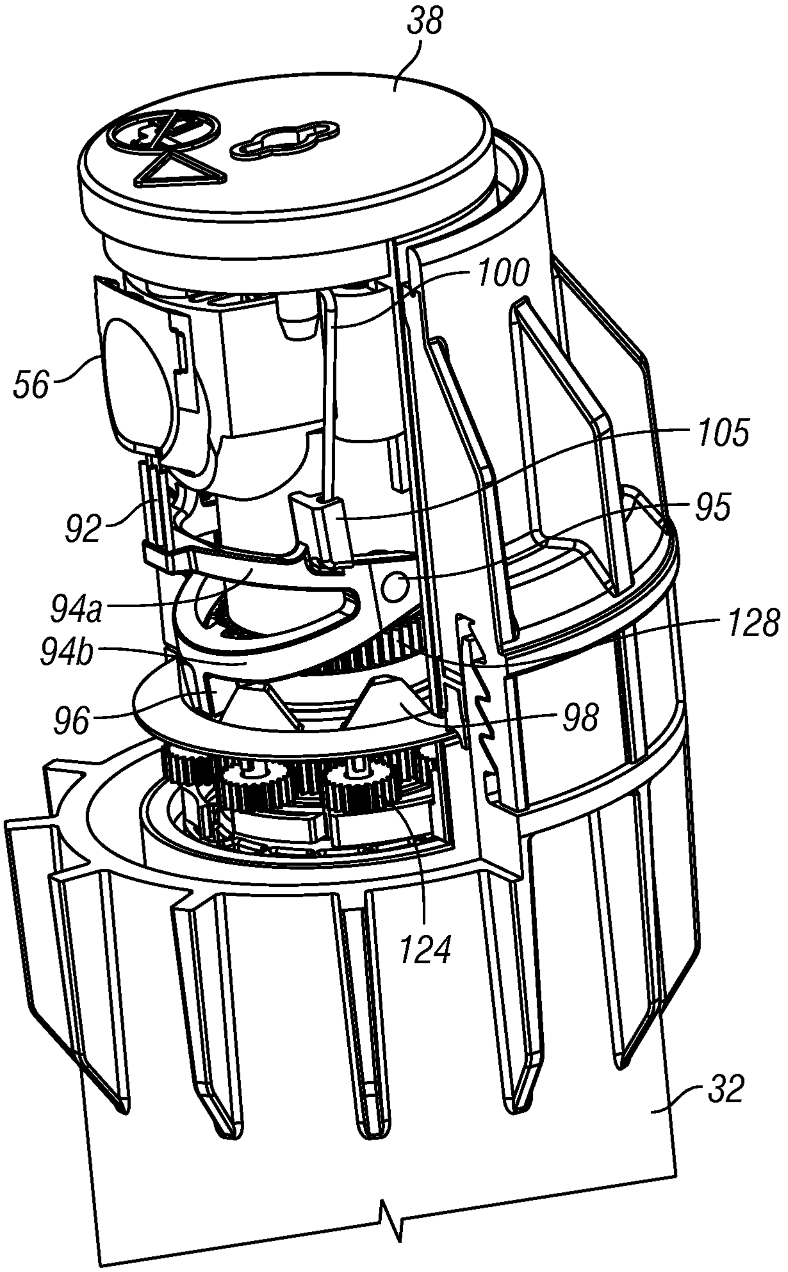
FIG. 9B is a view similar to FIG. 9A, slightly rotated about the vertical axis of the sprinkler.
Figure 9C:
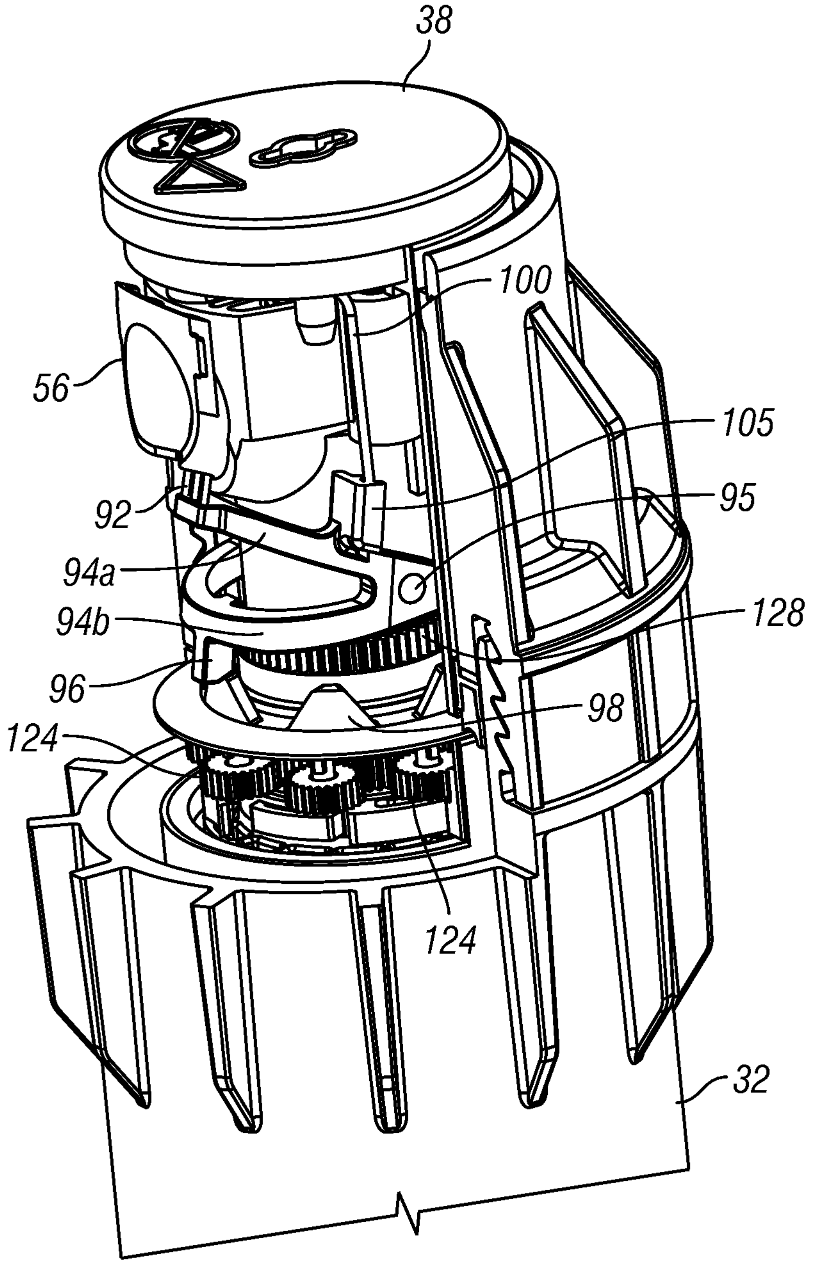
FIG. 9C is a view similar to FIG. 9B with the yoke of the diffuser mechanism after it has been moved to its raised position so that the diffuser pins of the diffuser mechanism are in a position for intercepting a stream of water (not illustrated) ejected from the nozzle.

FIGS. 9A, 9B, 9C and 10-13 illustrate details of a diffuser mechanism that intermittently moves a set of three parallel spaced-apart diffuser pins 92 (FIGS. 9A-9C) into and out of intercepting relationship with the stream of water emitted from the nozzle 56. The diffuser pins 92 are mounted to a pivotable yoke 94. The yoke 94 comprises a pair of upper and lower integrally formed part circle members 94*a* and 94*b* joined at their ends where they pivot about pivot pins 95. The diffuser pins 92 extend upwardly from the upper yoke member 94*a*. The diffuser pins can be inserted into and out of the nozzle 56 through a slot or recess in the lower side thereof. A yoke tab 96 extends downwardly from the lower yoke member 94*b* and engages triangular cams 98 as the turret assembly 54 rotates relative to the position of the cams 98. Resilient flexible arms 100 and 102 urge the yoke 94 and the yoke tab 96 in a downward direction applying the force required to keep yoke tab 96 in constant physical contact with the cams 98. The arms 100 and 102 function as springs and may be formed of a single U-shaped piece of stainless steel wire with an intermediate segment (not visible) that is firmly held in position in a slot (not visible) formed in the turret assembly 54. The terminal ends of this wire are received in channels formed in a pair of retainers 105 connected to opposite ends of the upper part circle member 94*a*. The lowered position of the yoke 94 is illustrated FIGS. 9A and 9B, and the raised position of the yoke 94 is illustrated in FIG. 9C. In this state, the yoke tab 96 is between a pair of the triangular cams 98. As one of the cams 98 forces the yoke tab 96 and the yoke 94 upwardly to its raised position (FIG. 9C), the diffuser pins 92 intercept the stream of water emitted from the nozzle 56 and the radius of the trajectory of water is shortened to irrigate landscape that is close to the sprinkler 30. When the cams 98 rotate to allow the yoke 94 to descend to its lowered position (FIGS. 9A and 9B), the diffuser pins 92 retract away from the stream of water allowing it to travel its maximum distance and irrigate landscape that is further away from the sprinkler 30. The cams 98 extend vertically upwardly from a ring-shaped cam plate 104 which is rotated by a ratcheting sun gear assembly as hereafter described. The cams 98 move rotationally in one direction only and at a rate that is much slower than the speed of rotation of the turret assembly 54.

Figure 10:
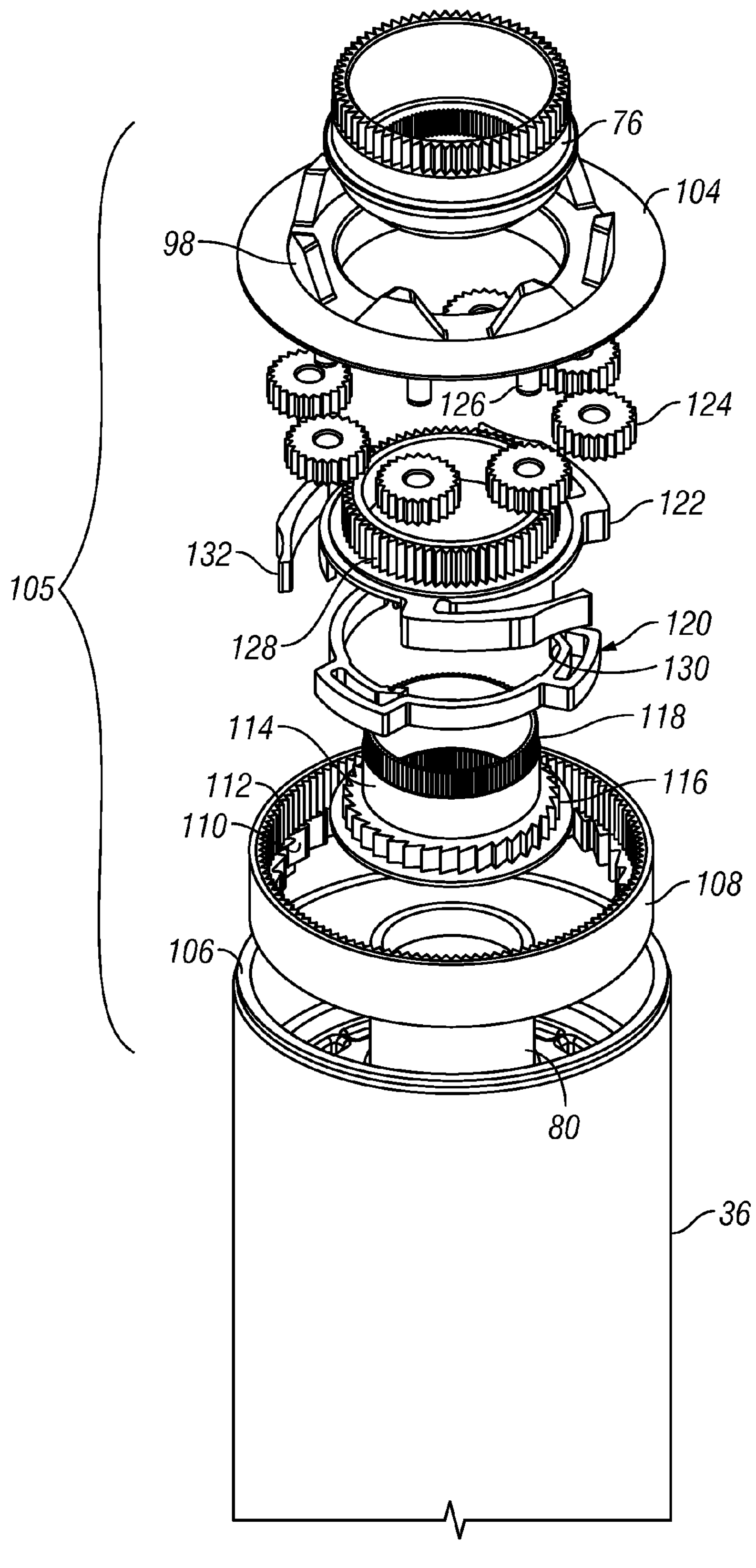
FIG. 10 is an enlarged exploded view if the ratcheting sun gear assembly of the diffuser mechanism.
Figure 11:
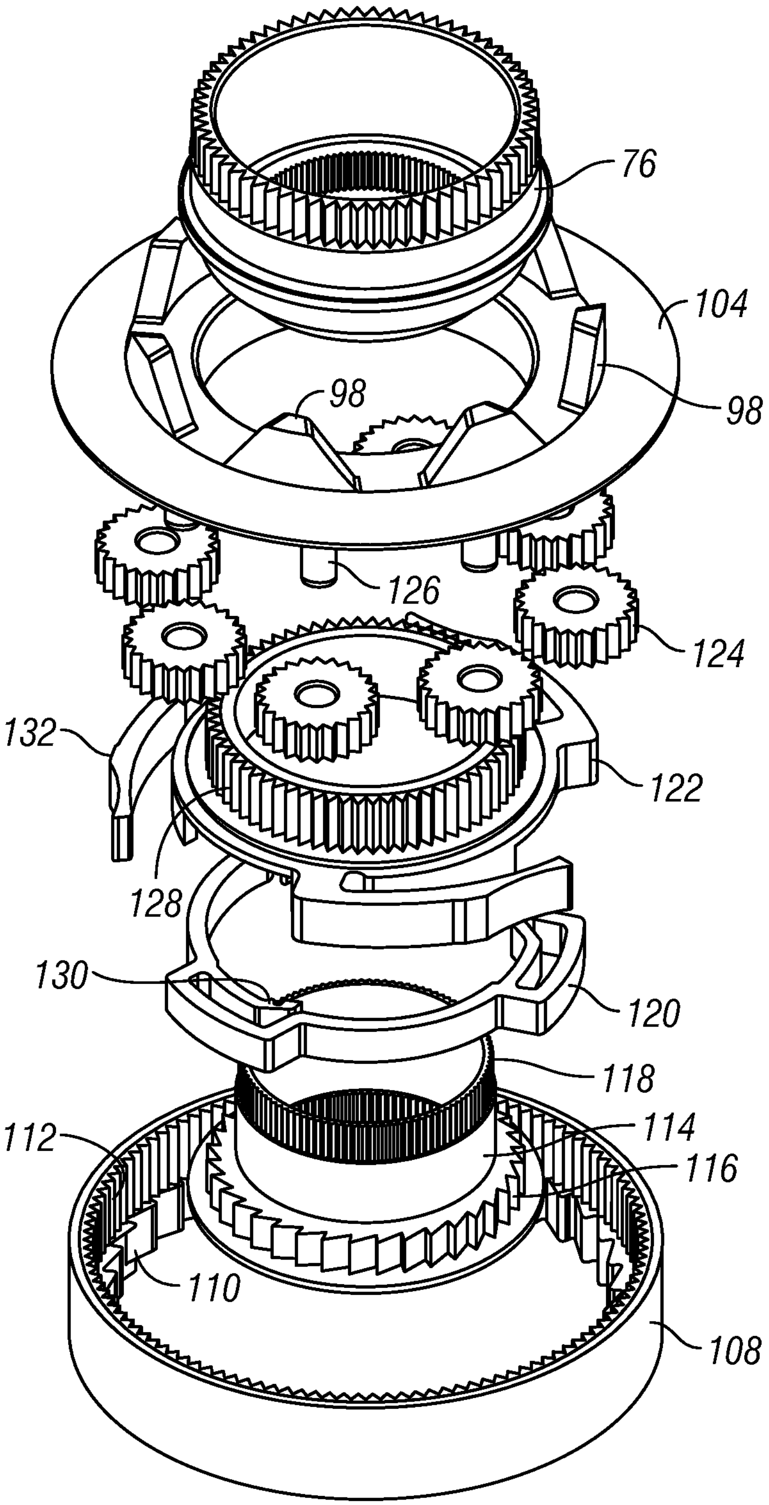
FIG. 11 is a further enlarged exploded view of the ratcheting sun gear assembly that is mounted in the top of the riser.
Figure 12:
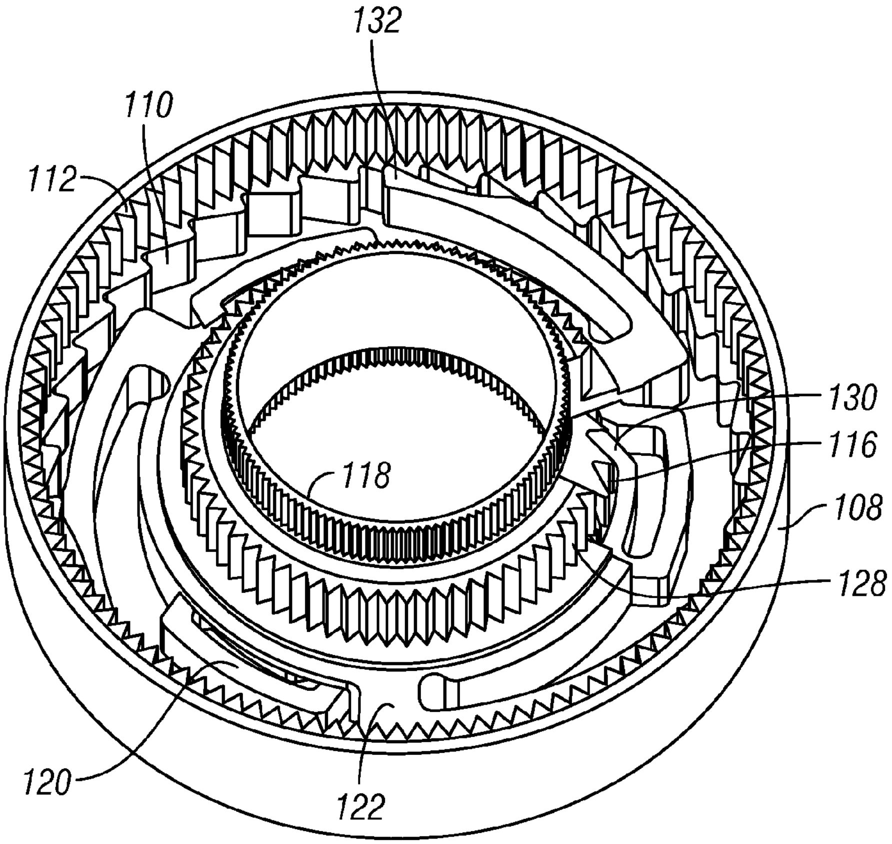
FIG. 12 is an enlarged isometric view of the assembled ratcheting sun gear assembly components.
Figure 13:
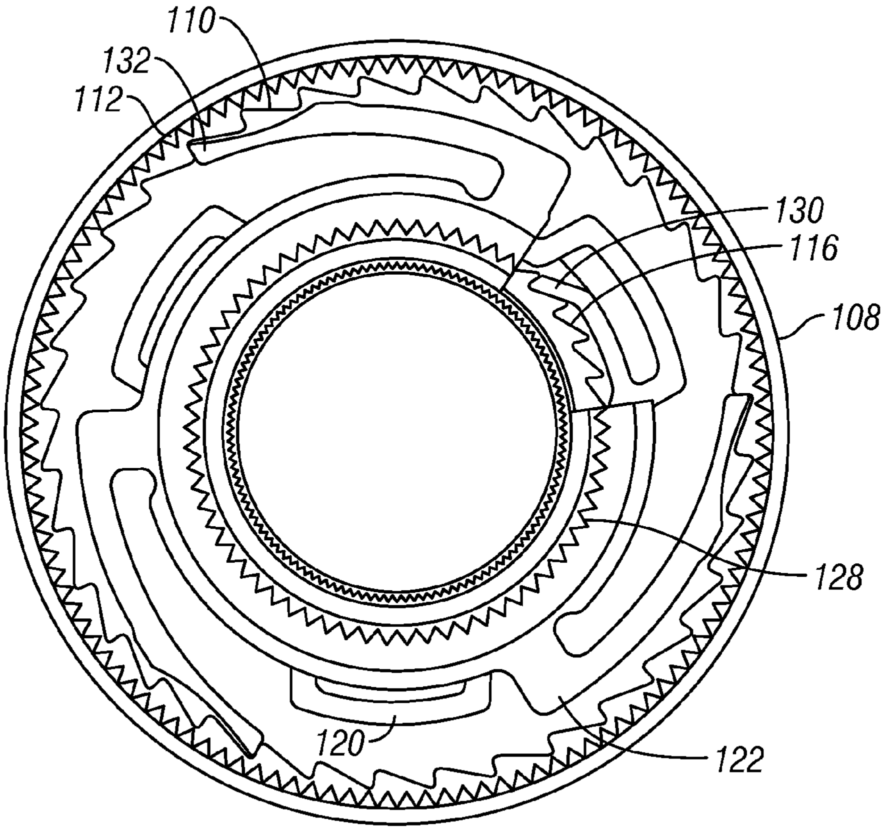
FIG. 13 is an enlarged top plan view of the ratcheting sun gear assembly with a portion of the sun gear cut away for clarity.

FIG. 10 illustrates the construction of a ratcheting sun gear assembly 105 that reciprocates the diffuser pins 92. The stainless steel sleeve 37 that forms the outer casing of the riser 36 (FIG. 10) is held securely in place by a sleeve retainer ring 106 which is rigidly secured to the inner plastic body of the non-rotating riser 36. An outer drive ring 108 is securely mounted to the stationary sleeve retainer ring 106 and includes a plurality of inwardly projecting saw-tooth counter-clockwise ratchet stops 110 formed on the lower part of its inside diameter, and a ring gear 112 formed on an upper part of its inside diameter. A clockwise drive sleeve 114 includes clockwise ratchet teeth 116 and coupling teeth 118 and is rotationally coupled to the outside of the bull gear stem 80. An inner ratchet drive member 120 is joined in a non-rotatable fashion to an outer ratchet drive member 122 (FIGS. 11-12). The assembled inner and outer drive members 120 and 122 fit over the outside diameter of drive sleeve 114 and can move freely in a radial direction. A plurality of planetary gears 124 are rotatably mounted over corresponding circumferentially spaced vertical posts 126 which extend from the bottom side of the cam plate 104 beneath the cams 98. The planetary gears 124 mesh with the ring gear 112 and a sun gear 128 which is formed on the upper side of the outer ratchet drive member 122. During clockwise rotation, inner ratchet dog 130 (FIG. 10) is engaged with internal ratchet teeth 116 to drive the sun gear 128 rotationally in relationship to the outer drive ring 108. This causes the planetary gears 124 to turn between sun gear 128 and the ring gear 112 to rotate the cam plate 104 and the cams 98 in a clockwise direction. An outer ratchet arm 132 flexes past the ramps on the back sides of counter-clockwise ratchet stops 110 to allow the sun gear 128 to rotate in a clockwise direction. This is the normal direction of rotation when the sprinkler 30 is set for the turret assembly 54 to turn in a full circle 360 degree rotation mode. When the arc adjusting gear 74 (FIG. 8) is turned to cause the sprinkler 30 to cover an arc of less than 360 degrees, the nozzle 56 oscillates back and forth between clockwise rotation and counter-clockwise rotation. When the bull gear stem 80 and turret assembly 54 rotate counter-clockwise, the outer ratchet arm 132 stops on one of the radially extending faces of ratchet stop 110 and the inner ratchet dog 130 flexes past the rotating inner ratchet teeth 116 to prevent the sun gear 128 from rotating in the counter-clockwise direction.

Thus it will be understood by those skilled in the art that the rotor-type sprinkler 30 has a drive assembly that couples the nozzle 56 and the gear train reduction 62 that is configured to allow the user to select between a full-circle mode of operation and an oscillating mode of operation. In addition, the sprinkler 30 includes a diffuser mechanism, including the diffuser pins 92, the yoke 94, the cam plate 104 and the ratcheting sun gear assembly 105, that intermittently interrupts the stream of water ejected from the nozzle 56. In a part circle setting, the stream of water is interrupted during both clockwise and counter-clockwise rotation of the nozzle 56. The diffuser mechanism is configured so that the timing of the stream interruption varies between each successive clockwise and counter-clockwise cycle of rotation of the nozzle 56 to ensure a substantially uniform water distribution over a preselected arc pattern of coverage. In a 360 degree full circle setting, the ratio of the gears cause the wetting pattern to cover a different area with each rotation of the turret assembly 54 to ensure a substantially uniform water distribution after a multiple number of revolutions.

Figure 14:
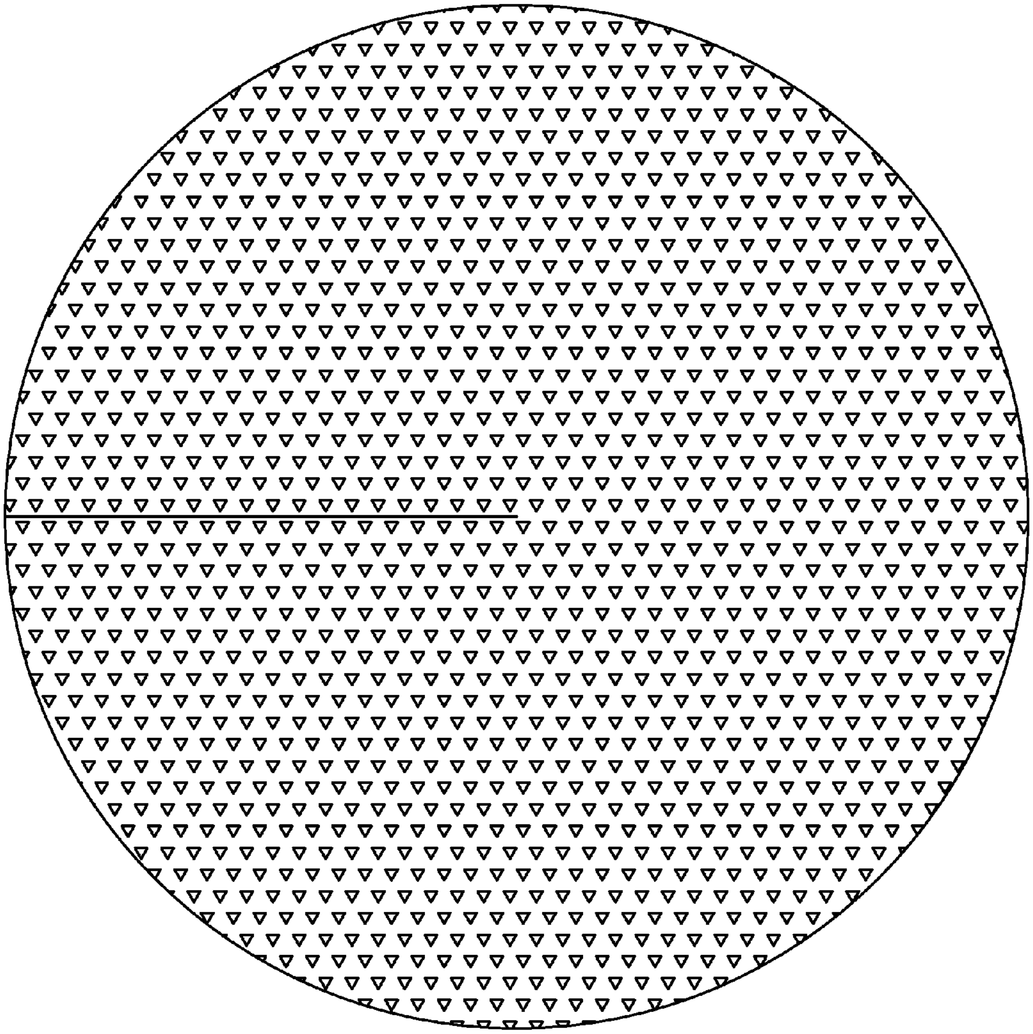
FIG. 14 (Prior Art)
FIG. 14 is a diagrammatic illustration of the watering pattern of a conventional rotor-type sprinkler after one complete revolution of the nozzle when set in a 360 degree full circle mode.

FIG. 14 illustrates the watering pattern of a conventional rotor-type sprinkler after one complete revolution of its nozzle when set in a 360 degree full circle mode. The small triangles diagrammatically represent the amount and distribution of water over the circular area of coverage. With a conventional rotor-type sprinkler, the amount of water coming out of the nozzle is sufficient to cover the entire radius of throw. Because the nozzle required to accomplish this distribution has a relatively large diameter discharge orifice, a conventional rotor-type sprinkler irrigating an area of sixty feet in radius typically wets the area at a rate of one-half inch (0.5") of water per hour over the entire irrigated area when installed to manufacturer's specifications. This is referred to as a precipitation rate of one-half inch which is the same as receiving one-half inch of rain in one hour over the area. Although this is generally considered to be efficient in the residential and commercial irrigation industry, some soils such as heavy clay, or slope areas of vegetation cannot always absorb water at that rate of precipitation, and whatever water is not absorbed runs off and is wasted. In contrast, the same sixty foot radius area can be irrigated at a rate of 0.35" per hour with the low precipitation rate sprinkler 30 of the present invention. The nozzle in the conventional rotor-type sprinkler sprays out 17.5 gallons per hour while the nozzle 56 of the sprinkler 30 only uses thirteen gallons per hour to cover the same area, i.e. only 75% of the conventional rotor flow. This increased efficiency in water management saves water by reducing excess runoff.

Figure 15:
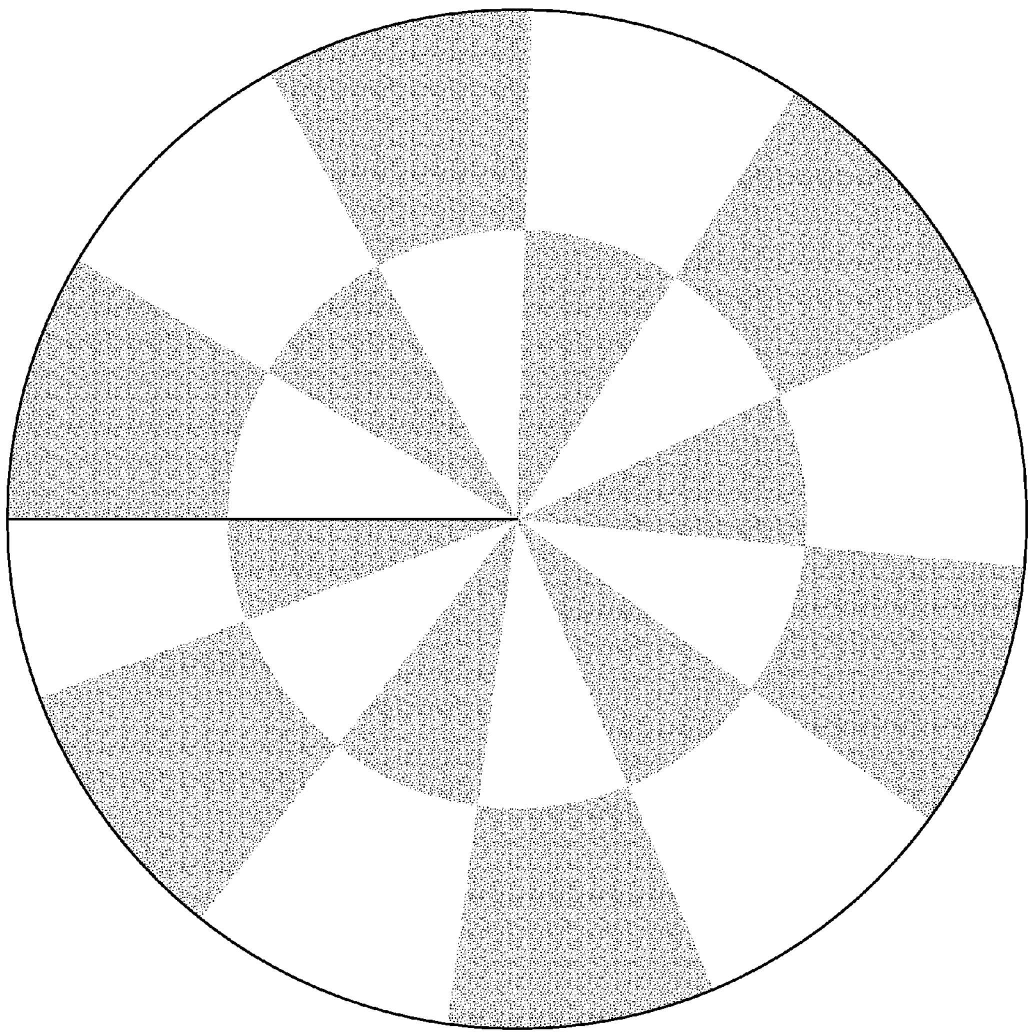
FIG. 15 is a diagrammatic illustration of the watering pattern of the sprinkler of FIG. 1 after one complete revolution of the nozzle when set in a 360 degree full circle mode.
Figure 16:
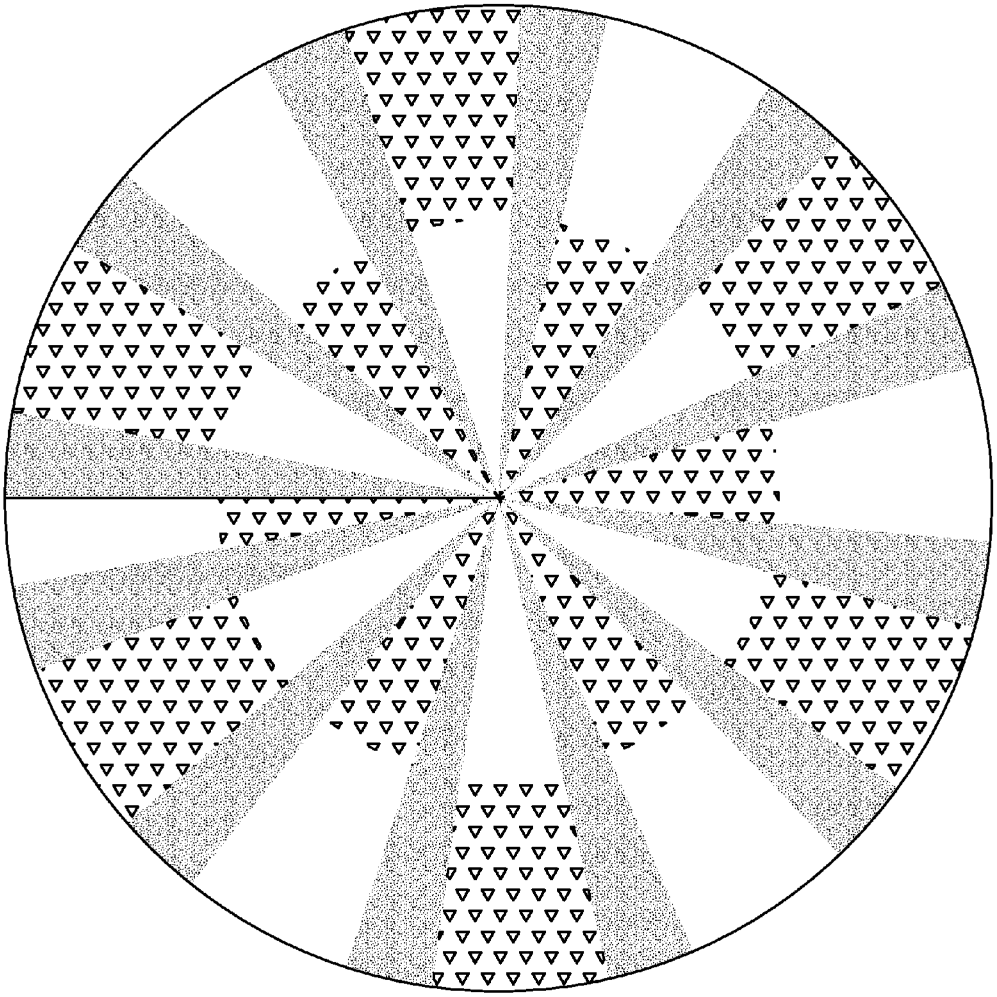
FIG. 16 is a diagrammatic illustration of the watering pattern of the sprinkler of FIG. 1 after two complete revolutions of the nozzle when set in a 360 degree full circle mode.

FIG. 15 illustrates the watering pattern of the sprinkler 30 after one complete revolution of the nozzle 56 when set in a 360 degree full circle mode. The shaded areas in FIG. 15 comprised of tiny dots represent the approximate wetted area after one complete rotation of the nozzle 56. The nozzle 56 of the low precipitation rate sprinkler 30 has a nozzle orifice with a smaller diameter than that of a conventional rotor-type sprinkler normally used to cover the same area. In a non-diffused mode, the water sprays to approximately the outer third of the radius of coverage. When the diffuser pins 92 interrupt the stream of water from the nozzle 56, the water covers only about two-thirds of the radius. The actual area of landscape covered in the diffused mode is approximately the same as the total area of landscape covered in the non-diffused mode, thus keeping the water coverage uniform. Because the nozzle 56 has a smaller nozzle orifice, and much less water is running through the sprinkler 30, the overall precipitation rate is significantly less than with a conventional rotor-type sprinkler otherwise employed to water the same area of turf or other landscaping. After one complete rotation of the nozzle 56, only one-half of the landscape has actually received any water. As a result of the combination of the number of cams 98 and the gear ratio of the planetary gears 124 relative to the sun gear 128 in the ratcheting sun gear assembly 105, at the end of the first full revolution of the nozzle 56, the pattern of water being applied has shifted. FIG. 16 illustrates the watering pattern of the sprinkler 30 after two complete revolutions of the nozzle 56 when set in a 360 degree full circle mode. Areas shaded with tiny dots indicate where water has been applied once. Areas shaded in small triangles indicate where the water has been applied twice. Areas not shaded have not received any water.

Figure 17:
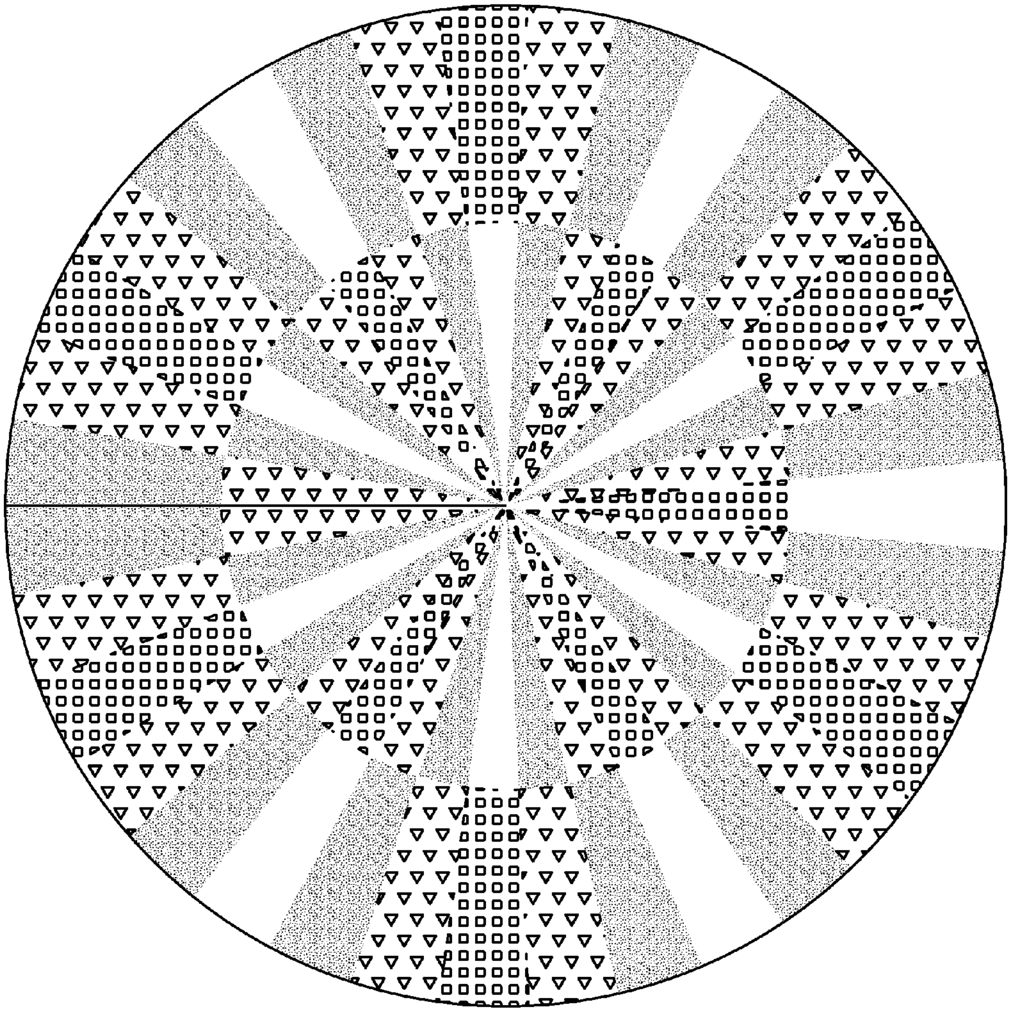
FIG. 17 is a diagrammatic illustration of the watering pattern of the sprinkler of FIG. 1 after three complete revolutions of its nozzle when set in a 360 degree full circle mode.
Figure 18:
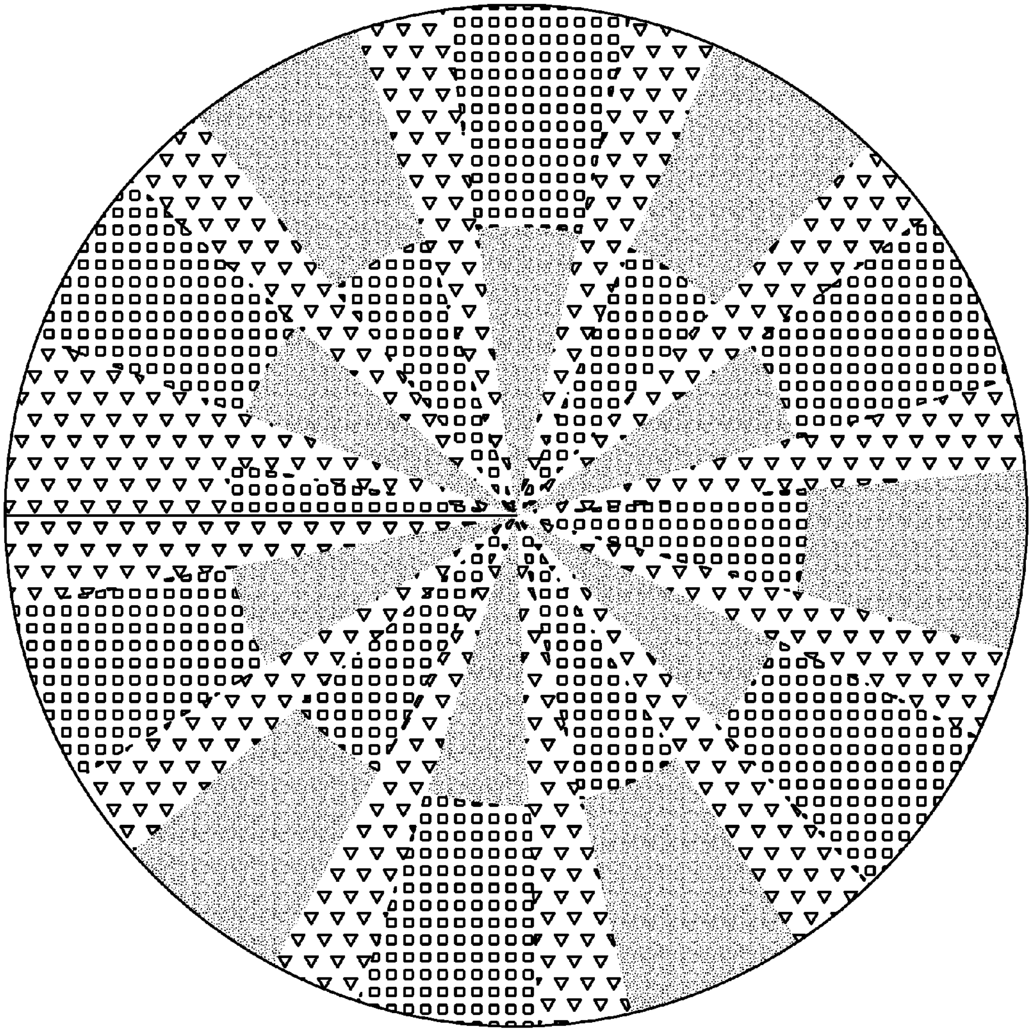
FIG. 18 is a diagrammatic illustration of the watering pattern of the sprinkler of FIG. 1 after four complete revolutions of its nozzle when set in a 360 degree full circle mode.
Figure 19:
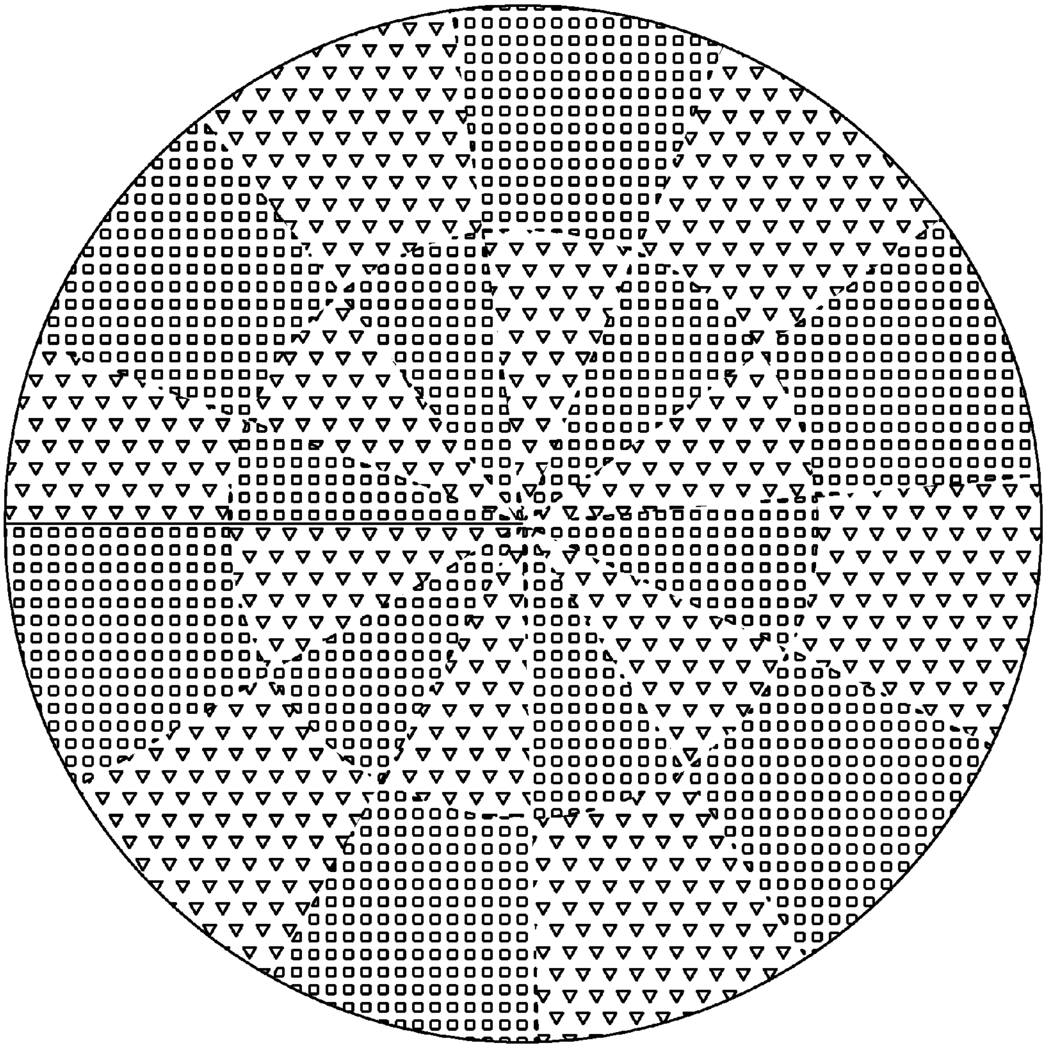
FIG. 19 is a diagrammatic illustration of the watering pattern of the sprinkler of FIG. 1 after five complete revolutions of its nozzle when set in a 360 degree full circle mode.
Figure 20:
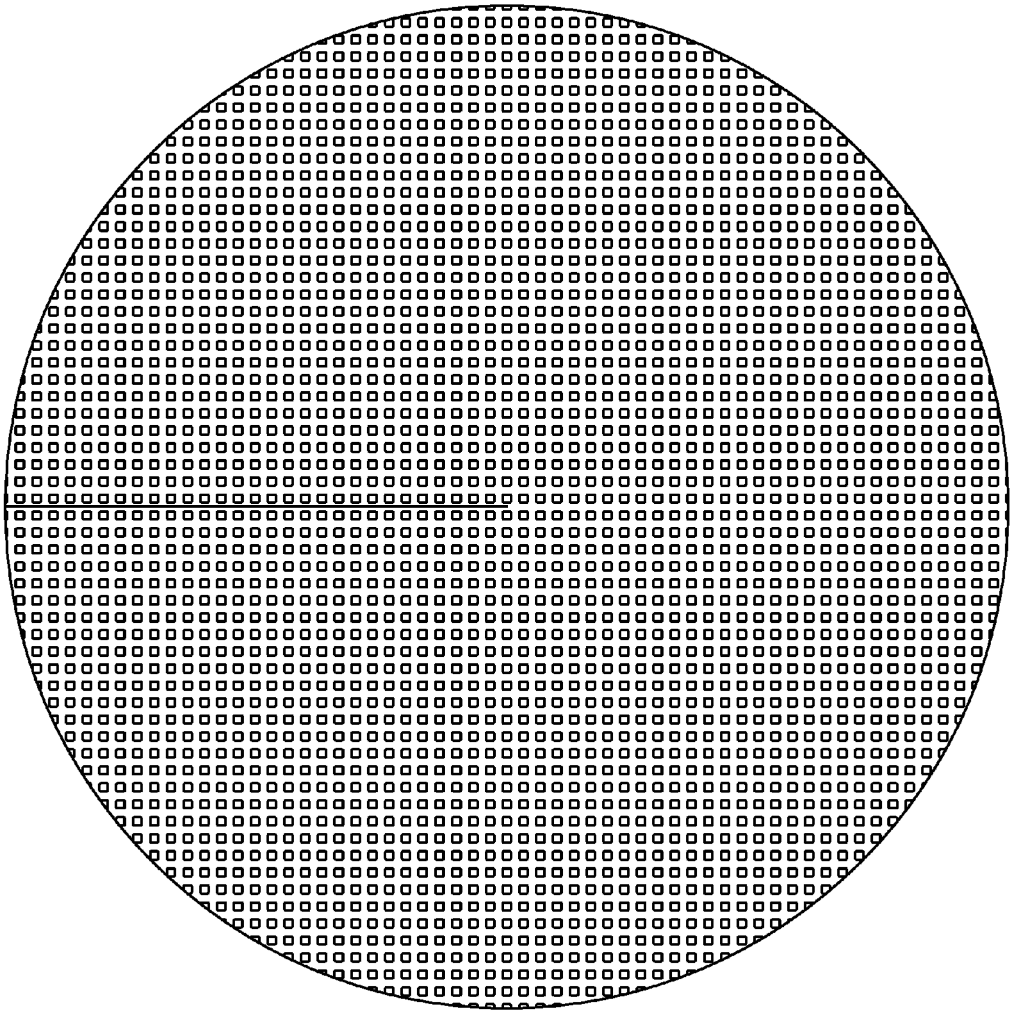
FIG. 20 is a diagrammatic illustration of the watering pattern of the sprinkler of FIG. 1 after six complete revolutions of its nozzle when set in a 360 degree full circle mode.

FIGS. 17-19 illustrate the manner in which the water distribution pattern of the sprinkler 30 is changed after three, four, and five complete revolutions of the nozzle 56, respectively. In these figures, the areas shaded with dots indicate areas where water has been applied once, areas shaded in small triangles indicate where water has been applied twice, and areas shaded in small squares indicate where water has been applied three times. FIG. 20 illustrates the watering pattern of the sprinkler 30 after six complete revolutions of the nozzle 56. All areas of turf or landscaping have been wetted three times after the nozzle 56 has made six complete revolutions. This shows that the water has been ultimately distributed in a very even pattern after six revolutions of the turret assembly 54. With a conventional rotor-type sprinkler is used, the same areas would have been wetted six times in the same number of revolutions at a higher precipitation rate. The number of revolutions required to cover the wetted area evenly may be altered by the gear ratio of the ratcheting sun gear assembly 105, the number of cams 98 on the cam plate 104, or other mechanical factors.

Figure 21:
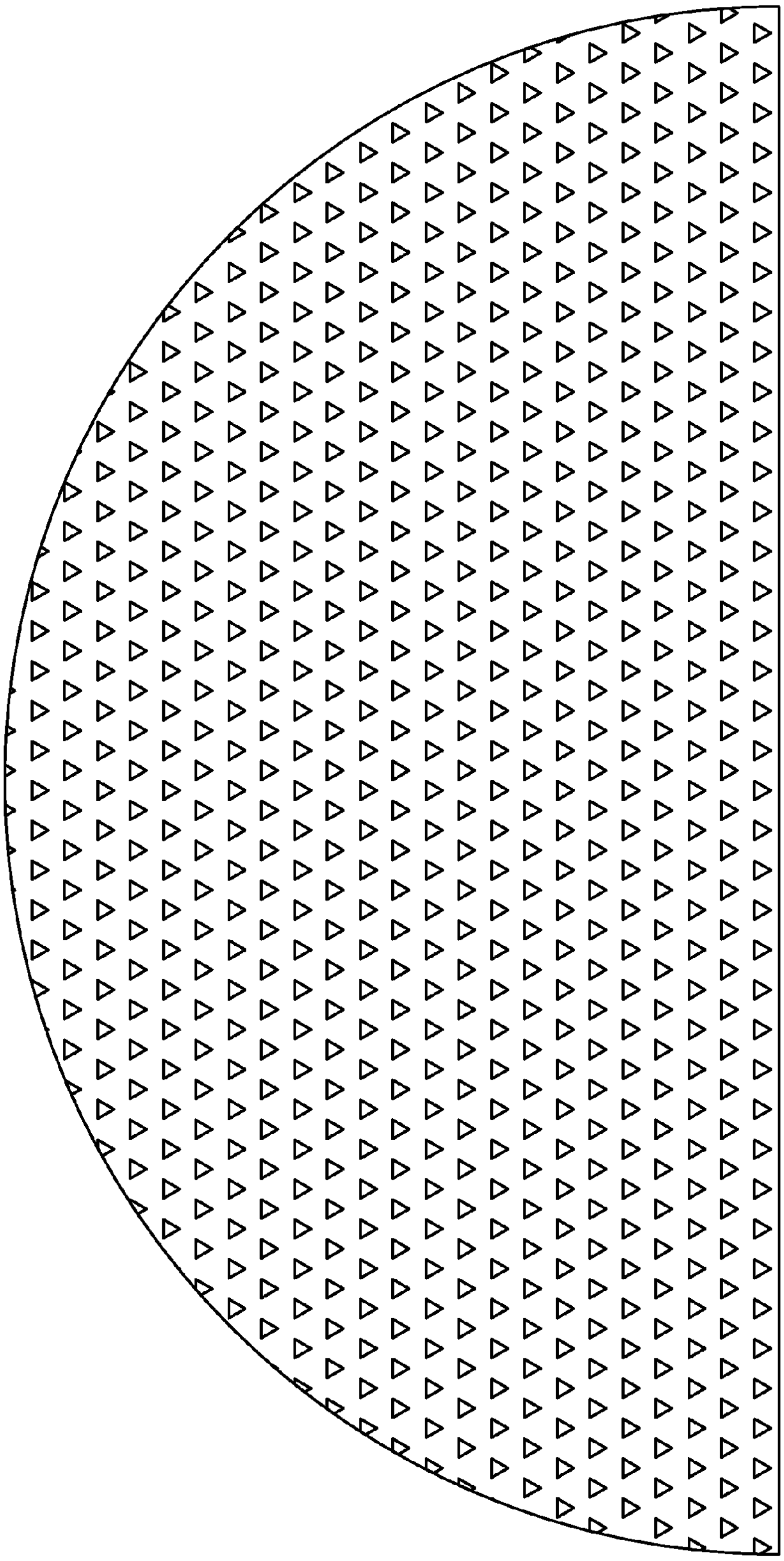
FIG. 21 (Prior Art)
FIG. 21 is a diagrammatic illustration of the watering pattern of a conventional rotor-type sprinkler after one pass of its nozzle when set at a 180 degree part circle (oscillating) mode.

FIG. 21 illustrates the watering pattern of a conventional rotor-type sprinkler after one pass or cycle of its nozzle in a clockwise direction when set in a 180 degree part circle mode. With a conventional rotor-type the amount of water coming out of the nozzle is sufficient to cover the entire radius of throw. This same area is covered with the same amount of water as it returns in the counter clockwise direction.

Figure 22:
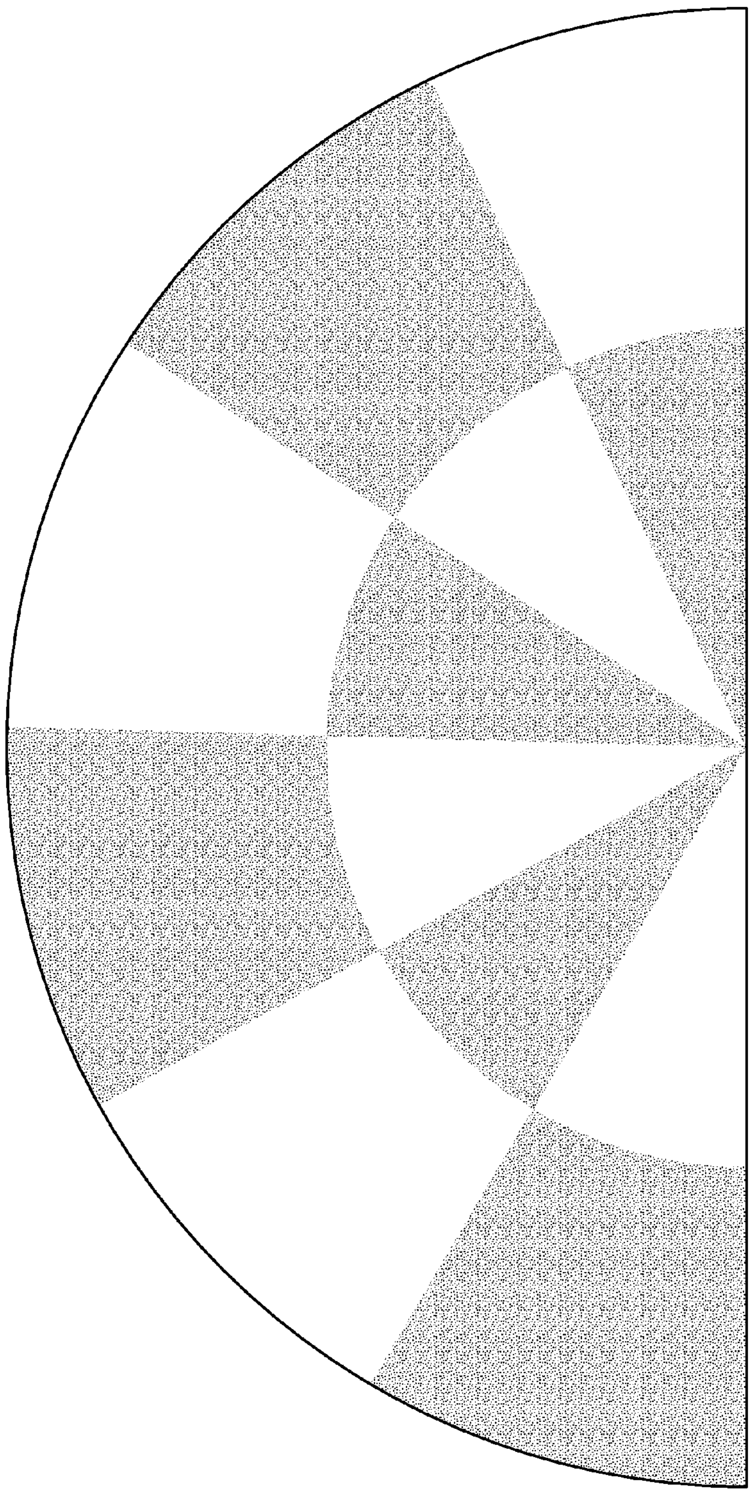
FIG. 22 is a diagrammatic illustration of the watering pattern of the sprinkler of FIG. 1 after one clockwise pass of its nozzle when set in a 180 degree part circle mode.

FIG. 22 illustrates the watering pattern of the sprinkler after one pass of the nozzle 56 in a clockwise direction when set to wet a 180 degree area in a part circle mode. The areas shaded with tiny dots represent the approximate wetted area after one pass of the nozzle in a clockwise direction. With the low precipitation rate sprinkler 30, the nozzle 56 can have a much smaller diameter nozzle orifice than the nozzle of a conventional rotor-type sprinkler sized to cover the same area. In a non-diffused mode, the water sprays to approximately the outer third of the radius of coverage. When the diffuser pins 92 interrupt the stream of water from the nozzle 56, the water covers only about two-thirds of the radius. The actual area of landscape covered in the diffused mode is approximately the same as the total area of landscape covered in the non-diffused mode, thus keeping the water coverage uniform. Because the nozzle 56 has an orifice with a smaller diameter, and much less water is therefore running through the sprinkler 30, the overall precipitation rate is less than that of a conventional rotor-type sprinkler normally used to water the same area of turf or landscaping.

Figure 23:
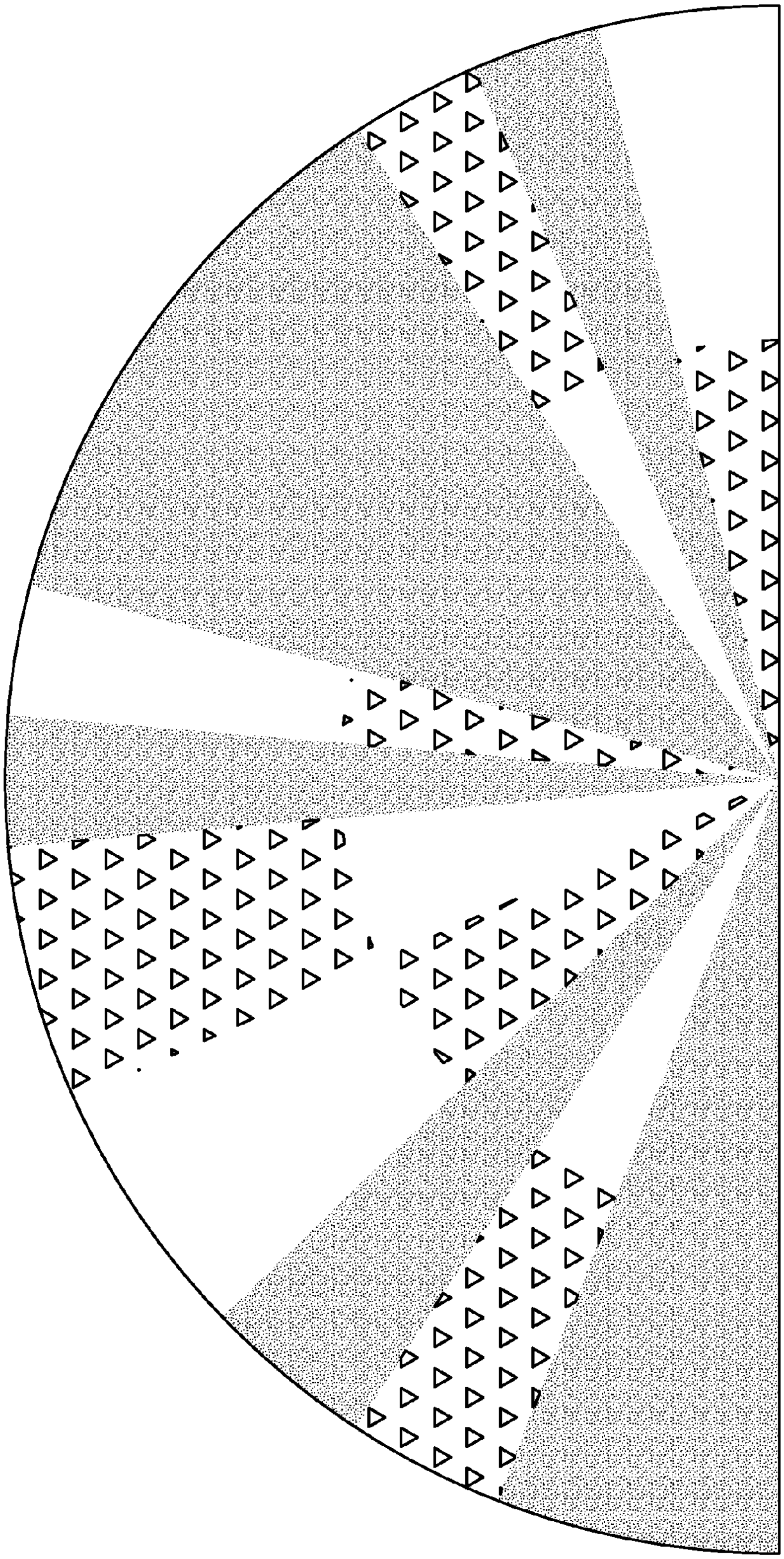
FIG. 23 is a diagrammatic illustration of the watering pattern of the sprinkler of FIG. 1 after one return counter-clockwise pass of its nozzle when set in a 180 degree part circle mode.
Figure 24:
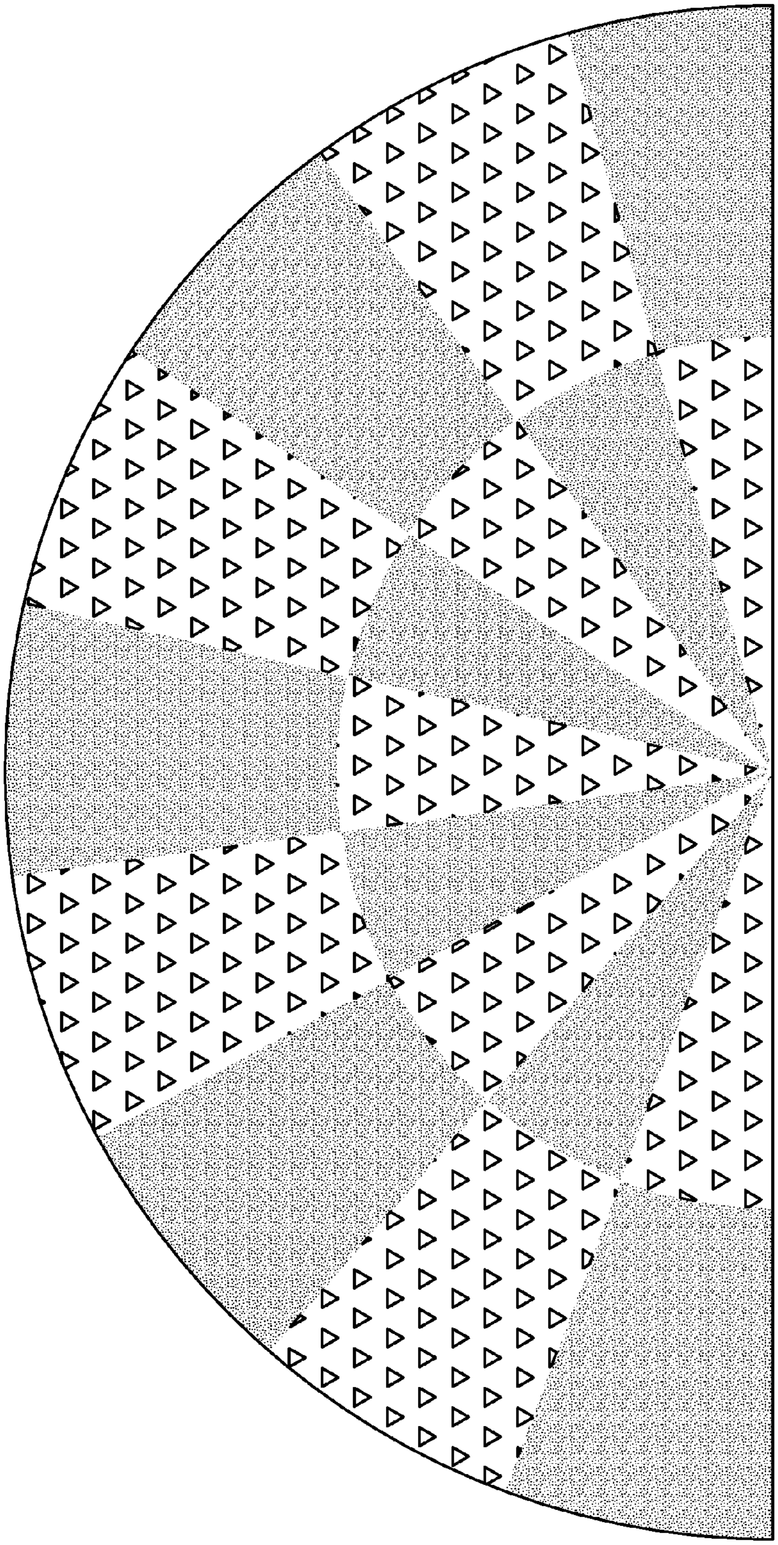
FIG. 24 is a diagrammatic illustration of the watering pattern of the sprinkler of FIG. 1 after a second clockwise pass of its nozzle when set in a 180 degree part circle mode.
Figure 25:
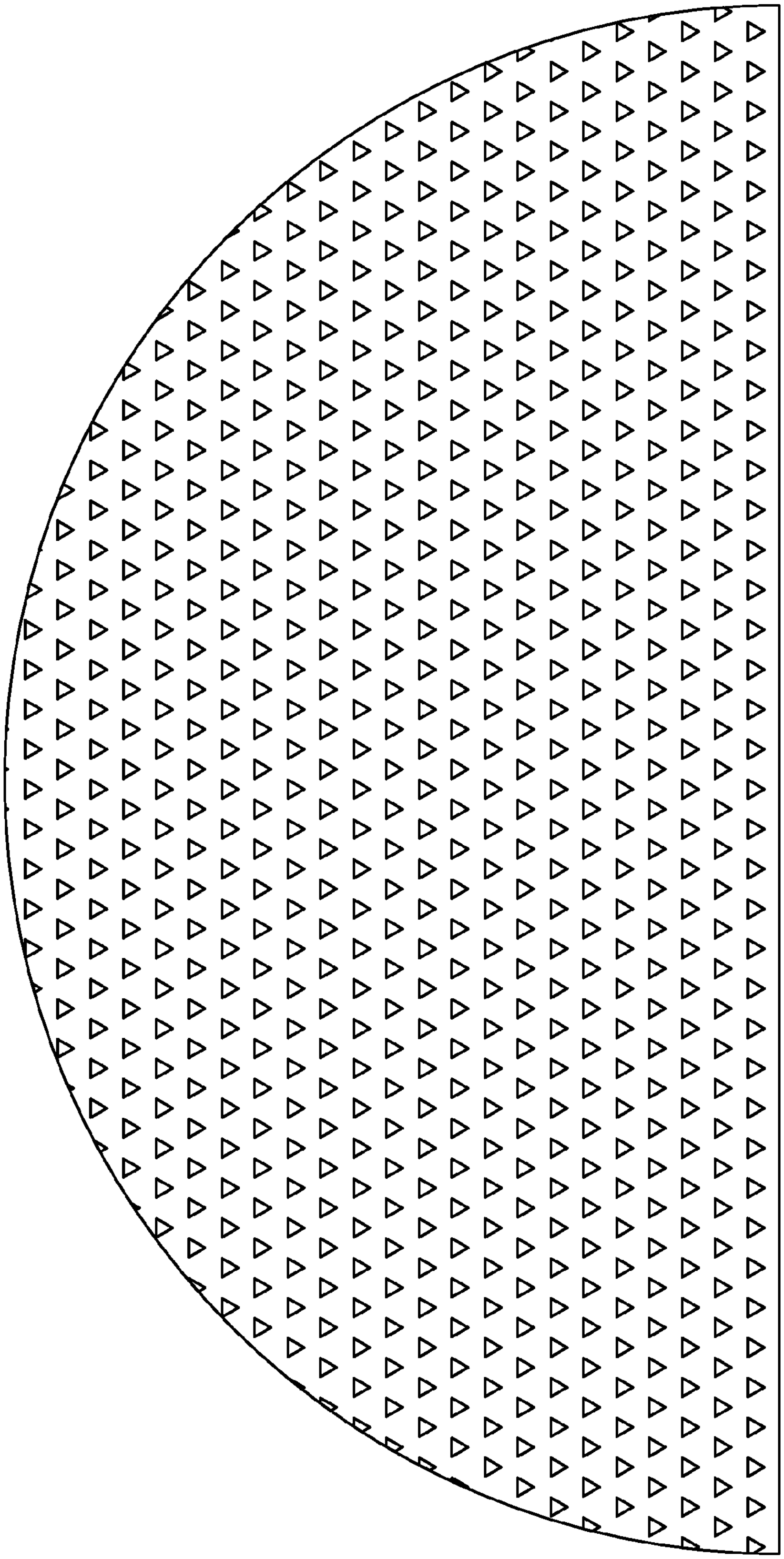
FIG. 25 is an illustration of the watering pattern of the sprinkler of FIG. 1 after a second return counter-clockwise pass when set in a 180 degree part circle mode.

When the nozzle 56 of the sprinkler 30 reverses direction to a counter-clockwise direction, the ratcheting sun gear assembly 105 is held in location and inhibited from moving. After one rotation of the nozzle 56, only one-half of the landscape has actually received any water. When the nozzle 56 of the sprinkler 30 shifts to a counter-clockwise rotation the cam plate 104 does not rotate, and therefore the wetting pattern changes to a more frequent diffused and non-diffused pattern as illustrated in FIG. 23. After rotation of the nozzle 56 in the counter-clockwise direction, the wetted area is quite different as illustrated in FIG. 23 where areas not wetted are blank, and the areas wetted by one pass are indicated by shading comprised of tiny dots, and areas wetted twice are illustrated by small triangles. Furthermore, the cam plate 104 is now in a different position relative to where it started the first pass, so water will now be applied in different areas on the next clockwise rotation of the nozzle 56. This is because the cam plate 104 did not rotate in the counter-clockwise direction, so the cam plate 104 resumes operation where it left off from the first clockwise pass. FIG. 24 illustrates the manner in which the wetted area is affected by the next clockwise pass or cycle of rotation of the nozzle 56. FIG. 25 illustrates the manner in which the 180 degree area of coverage is evenly wetted two times after four back and forth passes of the nozzle 56. The exact wetting pattern will vary based on the number of cams 98 and the gear ratio of the ratcheting sun gear assembly 105. Furthermore, the wetting pattern will be affected by the selected arc of coverage. Because the ratcheting sun gear assembly 105 only rotates in one direction, the starting point of the wetted pattern in either the clockwise or counter-clockwise direction will vary with each revolution, and based on the arc setting, several passes may be required to get even coverage, however after one or more adequate run times of the zone including the sprinkler 30, the entire area will be wetted to a uniform coverage at a lower precipitation rate than with conventional rotor-type sprinklers. When the sprinkler 30 stops running, the geared diffuser mechanism does not change, so it starts where it left off the next time the valve supplying water to the sprinkler 30 is turned ON, insuring even coverage over time.

In addition to a novel sprinkler, we have also provided a novel method of irrigating turf or landscaping. The method includes the steps of providing a sprinkler with a nozzle that ejects a stream of water and rotating the nozzle while the nozzle is ejecting the stream of water in successive alternating cycles in clockwise and counter-clockwise directions between pre-set arc limits. The method further includes the step of intermittently interrupting the stream of water to alter a radius of the stream of water while the nozzle is being rotated in both the clockwise and counter-wise directions. Prior oscillating rotor-type sprinklers with intermittent stream diffusers have only interrupted the stream in one direction of rotation of the nozzle. Our method improves the uniformity of the water distribution. A refinement of the aforementioned method involves the additional step of varying the timing of the stream interruption between each successive clockwise and counter-clockwise cycle of rotation of the nozzle to further ensure a substantially uniform water distribution over a pre-selected arc pattern of coverage.

We have also provided another novel method of irrigating turf or landscaping that includes the steps of providing a sprinkler that is capable of operating in either an oscillating part circle function, or in a 360 degree continuous uni-directional manner, while the nozzle is ejecting the stream of water. The method further includes the step of intermittently interrupting the stream of water to alter a radius of the stream of water while the nozzle is being rotated in the continuous uni-directional manner. A timing of the stream interruption is varied between each successive full cycle of rotation of the nozzle to ensure a substantially uniform water distribution over the circular area of coverage.

While we have disclosed an embodiment of a rotor-type sprinkler with selectable oscillation mode and full circle mode and with a stream diffuser that operates in both modes, and novel methods of sprinkler irrigation utilizing stream interruption, it will be understood by those skilled in the art that our invention can be modified in both arrangement and detail. For example the illustrated embodiment can be manufactured in a shrub version that does not include the outer case 32, end cap 34 and spring 40. A ratcheting ring gear could be used instead of a ratcheting sun gear. A ratcheting cam ring on a ring gear could also be used. The ratcheting mechanism could be held against relative movement in either the clockwise or counterclockwise direction. Therefore the protection afforded our invention should only be limited in accordance with the following claims.

We claim:

1. An irrigation sprinkler, comprising:
- a riser;
- a nozzle mounted at the top of the riser for rotation and configured to emit a stream of water;
- a gear train reduction mounted in the riser;
- a turbine coupled to an input shaft of the gear train reduction and rotatable by water flowing through the riser;
- a drive assembly coupling the nozzle and the gear train reduction and configured to allow a user to select between a non-oscillating mode of operation and an oscillating mode of operation; and
- a diffuser configured to intermittently interrupt the stream of water to intermittently alter a distance the stream of water travels from the sprinkler more than once during both a clockwise direction and a counter-clockwise direction of rotation of the nozzle;
- wherein the diffuser mechanism intermittently interrupts the stream more than one time during both the non-oscillating mode of operation and during the oscillating mode of operation.

2. The sprinkler of claim 1 wherein the diffuser mechanism includes a ratcheting sun gear assembly.

3. The sprinkler of claim 1 wherein the diffuser mechanism is configured so that a timing of the stream interruption varies between each successive clockwise and counter-clockwise cycle of rotation of the nozzle to ensure a substantially uniform water distribution over a pre-selected arc pattern of coverage.

4. The sprinkler of claim 1 wherein the diffuser mechanism is configured so that the wetted area varies with each successive continuous rotation of the nozzle to ensure a substantially uniform water distribution after a multiple number of rotations.

5. An irrigation sprinkler, comprising:
- a riser;
- a nozzle mounted at the top of the riser for rotation and configured to emit a stream of water;
- a diffuser mechanism that can intermittently interrupt the stream of water to alter a distance the stream of water travels from the sprinkler as the nozzle rotates;
- a gear train reduction mounted in the riser;
- a turbine coupled to an input shaft of the gear train reduction and rotatable by water flowing through the riser;
- a drive assembly coupling the nozzle and the gear train reduction and configured to allow a user to select an arc pattern of coverage in which the nozzle rotates in successive cycles in a clockwise direction and a counter-clockwise direction between a pair of pre-set arc limits; and
- the diffuser mechanism being configured to intermittently interrupt the stream of water to intermittently alter a distance the stream of water travels from the sprinkler more than once during both the clockwise direction and counter-clockwise directions of rotation of the nozzle.

6. The sprinkler of claim 5 wherein the diffuser mechanism is further configured so that a timing of the stream interruption varies between each successive clockwise and counter-clockwise cycle of rotation of the nozzle to ensure a substantially uniform water distribution over a pre-selected arc pattern of coverage.

7. The sprinkler of claim 5 wherein the drive assembly is configured to allow a user to select between a uni-directional continually-rotating mode of operation and a reversing mode of operation.

8. The sprinkler of claim 5 wherein the diffuser mechanism includes a ratcheting sun gear assembly.

9. The sprinkler of claim 5 wherein the diffuser mechanism is configured so that the wetted area varies with each successive continuous rotation of the nozzle to ensure a substantially uniform water distribution after a multiple number of rotations.

10. A method of irrigating turf or landscaping, comprising the steps of:
- providing a gear-driven irrigation sprinkler with a nozzle that ejects a stream of water;
- rotating the nozzle while the nozzle is ejecting the stream of water in successive alternating cycles in clockwise and counter-clockwise directions between pre-set arc limits; and
- intermittently interrupting the stream of water more than one time while the nozzle is being rotated in the clockwise direction to alter a distance the stream of water travels from the sprinkler and intermittently interrupting the stream of water more than one time while the nozzle is being rotated in the counter-clockwise direction to alter a distance the stream of water travels from the sprinkler.

11. The method of claim 10 wherein a timing of the stream interruption is varied between each successive clockwise and counter-clockwise cycle of rotation of the nozzle to ensure a substantially uniform water distribution over a pre-selected arc pattern of coverage.

12. A method of irrigating turf or landscaping, comprising the steps of:

providing a sprinkler that can be selected to operate in either an oscillating, or a uni-directional continually-rotating fashion with a nozzle that ejects a stream of water;

rotating the nozzle in the uni-directional continually-rotating fashion while the nozzle is ejecting the stream of water;

intermittently interrupting the stream of water to intermittently alter a distance the stream of water travels from the sprinkler more than once while the nozzle is being rotated in a uni-directional continually-rotating fashion; and varying a timing of the stream interruption between each successive full uni-direction revolution of rotation of the nozzle to ensure a substantially uniform water distribution over a circular area of coverage.

13. An irrigation sprinkler, comprising:

a riser;

a nozzle mounted for rotation at an upper end of the riser;

an arc adjustable reversing mechanism mounted in the riser and coupled to the nozzle, the arc adjustable reversing mechanism including a member that is manually movable to alternately select between a full-circle mode of operation and an oscillating mode of operation;

a turbine;

a gear train reduction mounted in the riser and coupling the arc adjustable reversing mechanism and the turbine; and a diffuser mechanism mounted adjacent the nozzle that can intermittently interrupt the stream of water to intermittently alter a distance the stream of water travels from the sprinkler as the nozzle rotates in a different timing between both successive clockwise and counter-clockwise cycles of rotation of the nozzle to ensure a substantially uniform water distribution over a pre-selected arc pattern of coverage;

wherein the diffuser mechanism intermittently interrupts the stream of water more than one time during the clockwise cycle of rotation to intermittently alter a distance the stream of water travels from the sprinkler and wherein the diffuser mechanism intermittently interrupts the stream of water more than one time during the counter-clockwise cycle of rotation to intermittently alter a distance the stream of water travels from the sprinkler.

14. The sprinkler of claim 13 wherein the diffuser mechanism includes a ratcheting sun gear assembly.

15. The sprinkler of claim 1 the diffuser mechanism intermittently interrupts the stream of water to intermittently alter a distance the water travels from the sprinkler in a pattern.

16. The method of claim 10 wherein the distance the stream of water travels from the sprinkler is altered in a pattern.

17. The method of claim 10, wherein the nozzle is rotated via impingement of water upon a turbine of the irrigation sprinkler.

18. The method of claim 10, wherein the stream of water is interrupted by a diffuser mechanism of the irrigation sprinkler.

19. The method of claim 18, wherein the diffuser mechanism is configured so that a timing of the stream interruption varies between each successive clockwise and counter-clockwise cycle of rotation of the nozzle to ensure a substantially uniform water distribution over a pre-selected arc pattern of coverage.

20. The method of claim 10, wherein the method includes transitioning a riser of the irrigation sprinkler from a retracted position to an extended position.

21. The method of claim 10, wherein the method includes transferring a rotational movement a turbine of the irrigation sprinkler to the nozzle via a gear train reduction.

* * * * *

UNITED STATES PATENT AND TRADEMARK OFFICE

CERTIFICATE OF CORRECTION

PATENT NO. : 8,636,229 B1
APPLICATION NO. : 12/612599
DATED : January 28, 2014
INVENTOR(S) : Clark et al.

It is certified that error appears in the above-identified patent and that said Letters Patent is hereby corrected as shown below:

In the Specification

In column 2 at line 14, Change “sprinkler” to --sprinkler.--.

In column 4 at line 58, After “motion” delete “of the”.

In the Claims

In column 12 at line 17, In Claim 15, after “claim 1” insert --wherein--.

Signed and Sealed this
Thirtieth Day of September, 2014

Michelle K. Lee

Michelle K. Lee
*Deputy Director of the United States Patent and Trademark Office*